(12) United States Patent
Kitahara et al.

(10) Patent No.: US 12,464,098 B2
(45) Date of Patent: Nov. 4, 2025

(54) LIGHT SOURCE DEVICE AND DISPLAY DEVICE

(71) Applicant: NICHIA CORPORATION, Anan (JP)

(72) Inventors: Wataru Kitahara, Kamiina-gun (JP); Takanori Aruga, Suwa-gun (JP)

(73) Assignee: Nichia Corporation, Anan (JP)

( * ) Notice: Subject to any disclaimer, the term of this patent is extended or adjusted under 35 U.S.C. 154(b) by 548 days.

(21) Appl. No.: 18/056,431

(22) Filed: Nov. 17, 2022

(65) Prior Publication Data

US 2023/0319245 A1 Oct. 5, 2023

(30) Foreign Application Priority Data

Mar. 30, 2022 (JP) ................. 2022-054739

(51) Int. Cl.
*H04N 9/31* (2006.01)
*G02B 3/00* (2006.01)
*G02B 27/28* (2006.01)

(52) U.S. Cl.
CPC ......... *H04N 9/3161* (2013.01); *G02B 3/0056* (2013.01); *G02B 27/283* (2013.01); *H04N 9/3164* (2013.01); *H04N 9/3167* (2013.01)

(58) Field of Classification Search
CPC .......... H04N 9/31; H04N 9/67; H04N 9/3105; H04N 9/3141; H04N 9/3152; H04N 9/3161; H04N 9/3164; H04N 9/3167; G02B 27/18; G02B 27/28; G02B 27/42; G02B 27/283; G02B 27/4233; G02B 27/4244; G02B 3/0043; G02B 3/005; G02B 3/0056; G03B 21/20; G03B 21/208; G03B 21/2013; G03B 21/2033; G03B 21/2053; G03B 21/2073
See application file for complete search history.

(56) References Cited

U.S. PATENT DOCUMENTS

| | | | |
|---|---|---|---|
| 2011/0187998 A1 | 8/2011 | Kimura et al. | |
| 2014/0354956 A1 | 12/2014 | Yamada et al. | |
| 2020/0301156 A1 | 9/2020 | Nagahara | |
| 2020/0301264 A1* | 9/2020 | Hu | H05B 47/155 |
| 2020/0379329 A1* | 12/2020 | Maeda | H04N 9/3158 |

(Continued)

FOREIGN PATENT DOCUMENTS

| | | |
|---|---|---|
| JP | 2008-003125 A | 1/2008 |
| JP | 2011-158502 A | 8/2011 |
| JP | 2020-154209 A | 9/2020 |

(Continued)

*Primary Examiner* — Sultan Chowdhury
(74) *Attorney, Agent, or Firm* — Kim & Stewart LLP

(57) ABSTRACT

A light source device includes a polarization multiplexing member including first and second regions, and a light source part. The light source part includes a first light source configured to emit a first laser beam having a first peak wavelength, a second light source configured to emit a second laser beam a second peak wavelength different from the first peak wavelength, a third light source configured to emit a third laser beam having the first peak wavelength, and a fourth light source configured to emit a fourth laser beam having the second peak wavelength. The first laser beam passes through the first region. The second laser beam passes through the second region. The third laser beam is reflected by the first region. The fourth laser beam is reflected by the second region.

20 Claims, 22 Drawing Sheets

(56) References Cited

U.S. PATENT DOCUMENTS

| | | | |
|---|---|---|---|
| 2021/0216004 A1* | 7/2021 | Yasumatsu | H04N 9/3164 |
| 2021/0405517 A1 | 12/2021 | Tanaka | |

FOREIGN PATENT DOCUMENTS

| | | |
|---|---|---|
| JP | 2021-135333 A | 9/2021 |
| JP | 2022-022509 A | 2/2022 |
| WO | 2013/105546 A1 | 7/2013 |

* cited by examiner

LIGHT SOURCE DEVICE AND DISPLAY DEVICE

CROSS-REFERENCE TO RELATED APPLICATIONS

This application is based upon and claims the benefit of priority from Japanese Patent Application No. 2022-054739, filed on Mar. 30, 2022; the entire contents of which are incorporated herein by reference.

FIELD

Embodiments described herein relate generally to a light source device and a display device.

BACKGROUND

A light source device is used in a display device such as a projector. Light source devices are desired to have a uniform illuminance distribution.

SUMMARY

According to an embodiment of the invention, a light source device includes a polarization multiplexing member including a first region and a second region, and a light source part. The light source part includes a first light source configured to emit a first laser beam having a first peak wavelength, a second light source configured to emit a second laser beam having a second peak wavelength different from the first peak wavelength, a third light source configured to emit a third laser beam having the first peak wavelength, and a fourth light source configured to emit a fourth laser beam having the second peak wavelength. The first laser beam is configured to pass through the first region. The second laser beam is configured to pass through the second region. The third laser beam is reflected by the first region. The fourth laser beam is reflected by the second region.

According to an embodiment of the invention, a light source device includes a polarization multiplexing member including a first region, a second region, a third region, and a fourth region, and a light source part. The light source part includes a first light source configure to emit a first laser beam having a first peak wavelength, a second light source configured to emit a second laser beam having a second peak wavelength different from the first peak wavelength, a third light source configured to emit a third laser beam having a third peak wavelength different from the first peak wavelength and different from the second peak wavelength, a fourth light source configured to emit a fourth laser beam having the second peak wavelength, a fifth light source configured to emit a fifth laser beam having the third peak wavelength, a sixth light source configured to emit a sixth laser beam having the second peak wavelength, a seventh light source configured to emit a seventh laser beam having the first peak wavelength, and an eighth light source configured to emit an eighth laser beam having the second peak wavelength. The first laser beam is configured to pass through the first region. The second laser beam is configured to pass through the second region. The third laser beam is reflected by the first region. The fourth laser beam is reflected by the second region. The fifth laser beam is configured to pass through the third region. The sixth laser beam is configured to pass through the fourth region. The seventh laser beam is reflected by the third region. The eighth laser beam is reflected by the fourth region.

DETAILED DESCRIPTION

Figure 1:
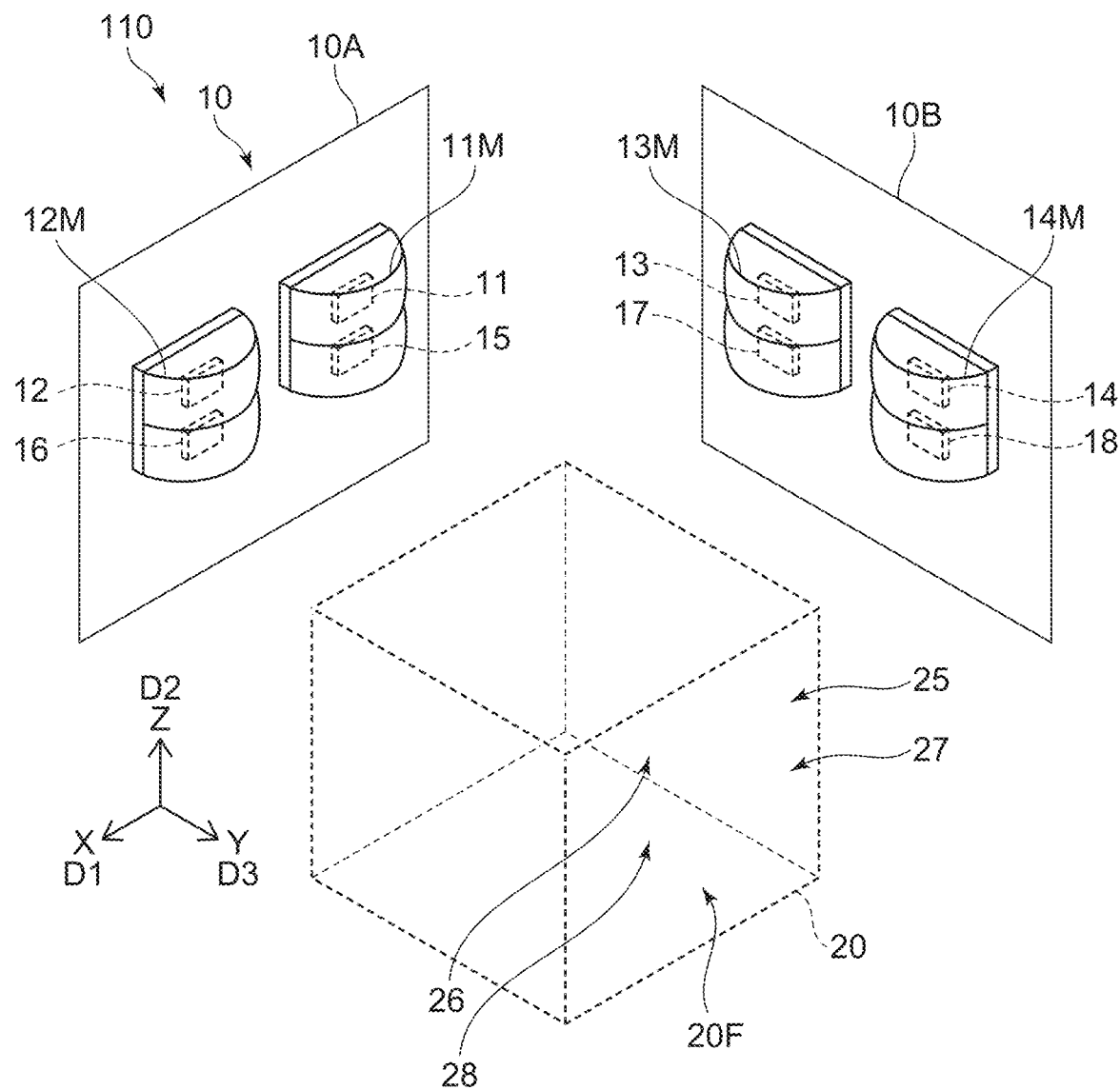
FIG. 1 is a schematic perspective diagram illustrating a light source device according to a first embodiment.

Various embodiments are described below with reference to the accompanying drawings.

The drawings are schematic and conceptual; and the relationships between the thickness and width of portions or elements, the proportions of sizes among portions or elements, etc., are not necessarily the same as the actual values. The dimensions and proportions may be illustrated differently among drawings, even for identical portions or elements.

In the specification and drawings, components similar to those described previously or illustrated in an antecedent drawing are marked with like reference numerals, and a detailed description is omitted as appropriate.

First Embodiment

FIG. 1 is a schematic perspective diagram illustrating a light source device 110 according to a first embodiment.

Figure 2:
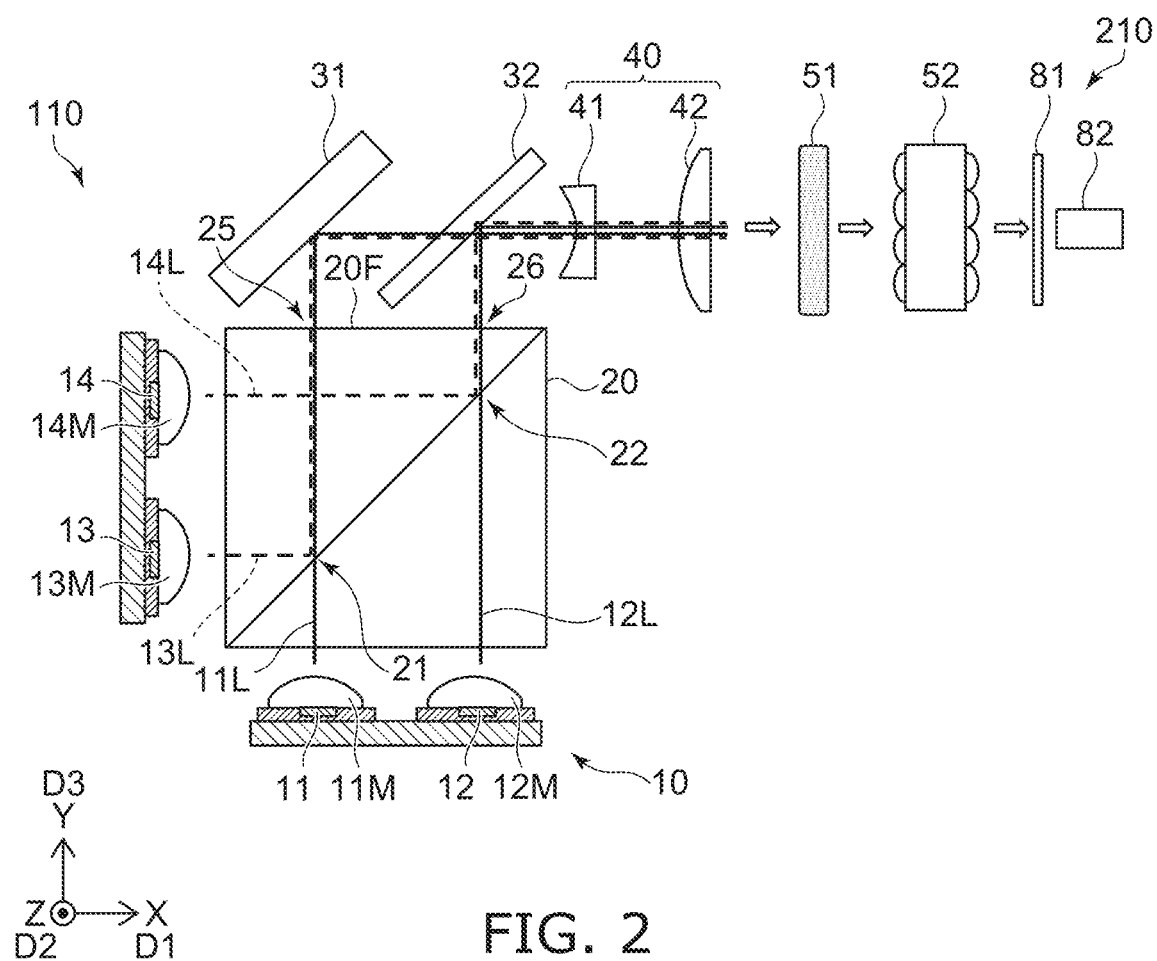
FIG. 2 is a schematic diagram illustrating a part of the light source device and a display device according to the first embodiment.
Figure 3:
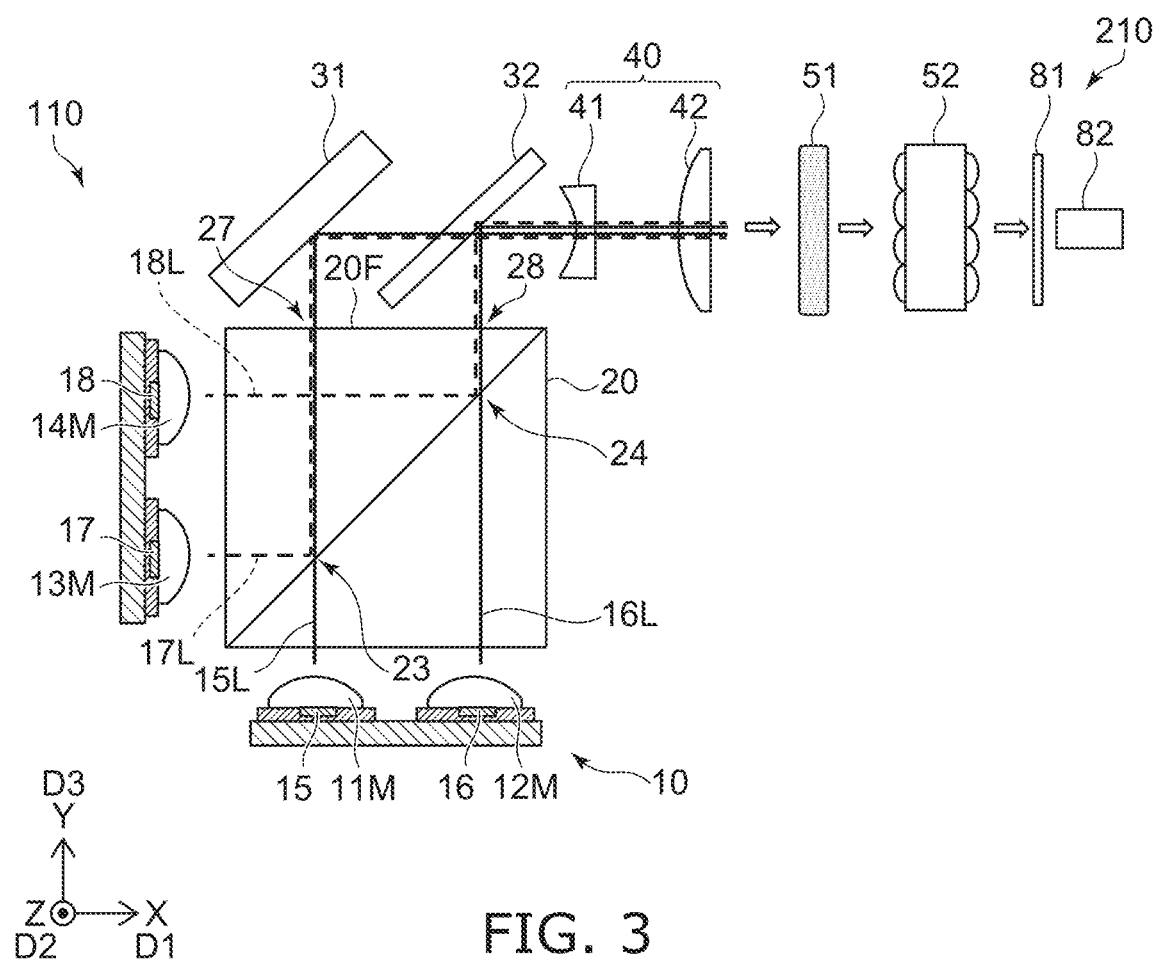
FIG. 3 is a schematic diagram illustrating another part of the light source device and the display device according to the first embodiment.

FIGS. 2 and 3 are schematic diagrams illustrating the light source device 110 and a display device 210 according to the first embodiment.

FIG. 1 illustrates a perspective view. FIGS. 2 and 3 illustrate plan views.

As shown in FIGS. 1 to 3, the light source device 110 according to the first embodiment includes a polarization multiplexing member 20 and a light source part 10. As shown in FIGS. 2 and 3, the polarization multiplexing member 20 includes a first region 21, a second region 22, a third region 23 and a fourth region 24. In the example of the light source device 110, the polarization multiplexing member 20 is a polarization beam splitter. As will be described below, the polarization multiplexing member 20 may be a polarizing element. The light source part includes a first light source 11, a second light source 12, a third light source 13, a fourth light source 14, a fifth light source 15, a sixth light source 16, a seventh light source 17 and an eighth light source 18.

As shown in FIG. 2, the first light source 11 emits a first laser beam 11L having a first peak wavelength. The second light source 12 emits a second laser beam 12L having a second peak wavelength. The second peak wavelength is different from the first peak wavelength. The third light source 13 emits a third laser beam 13L having a third peak wavelength. The third peak wavelength differs from the first peak wavelength and also differs from the second peak wavelength. The fourth light source 14 emits a fourth laser beam 14L having a second peak wavelength.

As shown in FIG. 3, the fifth light source 15 emits a fifth laser beam 15L having the third peak wavelength. The sixth light source 16 emits a sixth laser beam 16L having the second peak wavelength. The seventh light source 17 emits a seventh laser beam 17L having the first peak wavelength. The eighth light source 18 emits an eighth laser beam 18L having the second peak wavelength.

As shown in FIG. 2, the first laser beam 11L passes through the first region 21. The second laser beam 12L passes through the second region 22. The third laser beam 13L is reflected by the first region 21. The fourth laser beam 14L is reflected by the second region 22.

As shown in FIG. 3, the fifth laser beam 15L passes through the third region 23. The sixth laser beam 16L passes through the fourth region 24. The seventh laser beam 17L is reflected by the third region 23. The eighth laser beam 18L is reflected by the fourth region 24.

As shown in FIG. 1, for example, the first light source 11, the second light source 12, the fifth light source 15 and the sixth light source 16 are included in a first module 10A. The third light source 13, the fourth light source 14, the seventh light source 17 and the eighth light source 18 are included in a second module 10B.

In these two modules, the arrangement of light sources with different wavelengths is reversed vertically and horizontally. With such a configuration, it is easy to obtain light with a uniform illuminance distribution. According to the present embodiment, a light source device capable of uniforming the illuminance distribution is provided.

Speckles may occur in a light source device using laser light sources.

For example, a first reference example is conceivable in which light sources with different wavelengths are provided in the same direction in two modules, and light beams are made incident on the polarization multiplexing member from the respective light sources. In the first reference example, the position of the light beams emitted from the polarization multiplexing member differs for each wavelength. For that reason, in an optical switch (for example, a display device) into which the light emitted from the light source device is incident, the incident angle varies depending on the wavelength, making it difficult to obtain uniform angular multiplexing. When uniform angular multiplexing becomes difficult to obtain, the speckle contrast value increases and speckles occur.

In order to suppress the difference in the incident angle due to the wavelength as described above and to suppress the occurrence of speckles, a second reference example can be considered in which a sub-fly array lens is added to the configuration of the first reference example. In the second reference example, the addition of the sub-fly array lens increases the number of parts and lengthens the optical distance. For that reason, the size of the optical device is increased. Also, adding a sub-fly array lens increases cost.

On the other hand, in the light source device 110 according to the present embodiment, the arrangement of light sources with different wavelengths is reversed, and light beams from the respective light sources are made incident on the polarization multiplexing member. As a result, in an optical switch (for example, a display device) into which the light emitted from the light source device is incident, a difference in the incident angle due to wavelengths is suppressed, and uniform angular multiplexing is obtained. According to the present embodiment, since uniform angular multiplexing can be obtained, the speckle contrast value can be reduced and the occurrence of speckles can be suppressed, so that a light source device capable of uniforming the illuminance distribution can be provided. In addition, since uniform angular multiplexing can be obtained without adding a sub-fly array lens, it is possible to provide a light source device capable of uniforming the illuminance distribution while suppressing an increase in the size and cost of the device.

As shown in FIGS. 1 to 3, the polarization multiplexing member 20 may include a first surface 20F. The first surface 20F includes a fifth region 25, a sixth region 26, a seventh region 27 and an eighth region 28.

As shown in FIG. 2, the first laser beam 11L and the third laser beam 13L are emitted from the fifth region 25. The second laser beam 12L and the fourth laser beam 14L are emitted from the sixth region 26.

As shown in FIG. 3, the fifth laser beam 15L and the seventh laser beam 17L are emitted from the seventh region 27. The sixth laser beam 16L and the eighth laser beam 18L are emitted from the eighth region 28.

For example, the first to eighth laser beams 11L to 18L enter the polarization multiplexing member 20 (polarization beam splitter in this example). Light incident on the polarization multiplexing member 20 is emitted from the first surface 20F. The first surface 20F is an exit surface.

An region on the first surface 20F where the first laser beam 11L and the third laser beam 13L are emitted corresponds to the fifth region 25. An region on the first surface 20F where the second laser beam 12L and the fourth laser beam 14L are emitted corresponds to the sixth region 26. An region on the first surface 20F where the fifth laser beam 15L and the seventh laser beam 17L are emitted corresponds to the seventh region 27. An region on the first surface 20F where the sixth laser beam 16L and the eighth laser beam 18L are emitted corresponds to the eighth region 28.

In one example, the second peak wavelength is longer than the first peak wavelength. The first peak wavelength is longer than the third peak wavelength.

For example, the first laser beam 11L is green light. The peak wavelength of green light is not less than 495 nm and not more than 570 nm. The second laser beam 12L is red light. The peak wavelength of red light is not less than 605 nm and not more than 750 nm. The third laser beam 13L is blue light. The peak wavelength of blue light is not less than 420 nm and not more than 494 nm. The fourth laser beam 14L is red light. The fifth laser beam 15L is blue light. The sixth laser beam 16L is red light. The seventh laser beam 17L is green light. The eighth laser beam 18L is red light.

As shown in FIGS. 2 and 3, the light source device 110 may further include a first mirror 31 and a second mirror 32.

As shown in FIG. 2, the first laser beam 11L and the third laser beam 13L that have passed through the fifth region 25 are reflected by the first mirror 31 and pass through the second mirror 32. The second laser beam 12L and the fourth laser beam 14L that have passed through the sixth region 26 are reflected by the second mirror 32.

As shown in FIG. 3, the fifth laser beam 15L and the seventh laser beam 17L that have passed through the seventh region 27 are reflected by the first mirror 31 and pass through the second mirror 32. The sixth laser beam 16L and the eighth laser beam 18L that have passed through the eighth region 28 are reflected by the second mirror 32.

The first mirror 31 and the second mirror 32 function, for example, as wavelength multiplexing members. Lights of different wavelengths are mixed by the wavelength multiplexing members. The second mirror 32 is, for example, a dichroic mirror.

As shown in FIGS. 2 and 3, the light source device 110 may further include a light shaping member 40. The first laser beam 11L and the third laser beam 13L that have passed through the second mirror 32 pass through the light shaping member 40. The second laser beam 12L and the fourth laser beam 14L reflected by the second mirror 32 pass through the light shaping member 40. The fifth laser beam 15L and the seventh laser beam 17L that have passed through the second mirror 32 pass through the light shaping member 40. The sixth laser beam 16L and the eighth laser beam 18L reflected by the second mirror 32 pass through the light shaping member 40.

For example, the light shaping member 40 includes a first lens 41 and a second lens 42. In one example, the first lens 41 is one of a concave lens and a convex lens. In one example, second lens 42 is the other of a concave lens and a convex lens. For example, at least one of the first lens 41 or the second lens 42 may be a cylindrical lens.

Light including the first to eighth laser beams 11L to 18L is shaped by the light shaping member 40. The light shaping member 40 expands the width of the light including the first to eighth laser beams 11L to 18L in any direction and mixes the light.

As shown in FIGS. 2 and 3, the light source device 110 may further include a diffusion element 51. As the diffusion element 51, a cylinder lens array, a microlens array, a plate whose surface is textured, or the like can be used. The first to eighth laser beams 11L to 18L emitted from the light shaping member 40 enter the diffusion element 51. The diffusion element 51 controls the emission angle of light including the first to eighth laser beams 11L to 18L.

As shown in FIGS. 2 and 3, the light source device 110 may further include a fly-eye lens 52. The first to eighth laser beams 11L to 18L emitted from the diffusion element 51 pass through the fly-eye lens 52. The light including the first to eighth laser beams 11L to 18L is further shaped into substantially uniform light by the fly-eye lens 52.

As shown in FIGS. 2 and 3, the light emitted from the fly-eye lens 52 enters a control element 81. The control element 81 includes, for example, a plurality of optical switches. The control element 81 may include, for example, an element based on MEMS (Micro Electro Mechanical Systems). The control element 81 provides light for forming the image desired to be displayed.

As shown in FIGS. 2 and 3, an imaging optical member 82 may be provided. The imaging optical member 82 forms an image of light emitted from the control element 81. The imaging optical member 82 includes, for example, a projection lens or the like.

FIGS. 4 to 7 are schematic diagrams each illustrating a light profile according to the first embodiment.

These figures schematically show the profile of light on a plane perpendicular to the traveling direction of the light.

Figure 4:
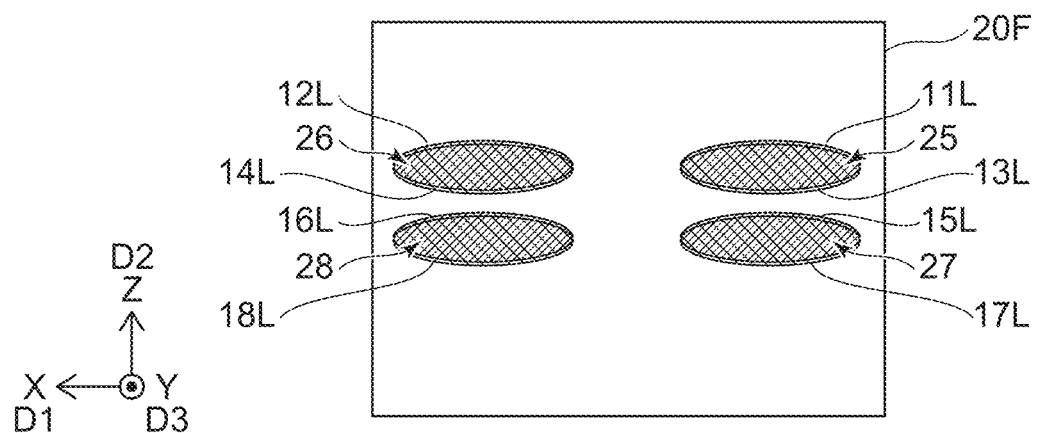
FIG. 4 is a schematic diagram illustrating a light profile according to the first embodiment.

FIG. 4 illustrates the profile of laser light on the first surface 20F. The first laser beam 11L and the third laser beam 13L pass through the fifth region 25. The second laser beam 12L and the fourth laser beam 14L pass through the sixth region 26. The fifth laser beam 15L and the seventh laser beam 17L pass through the seventh region 27. The sixth laser beam 16L and the eighth laser beam 18L pass through the eighth region 28.

Figure 5:
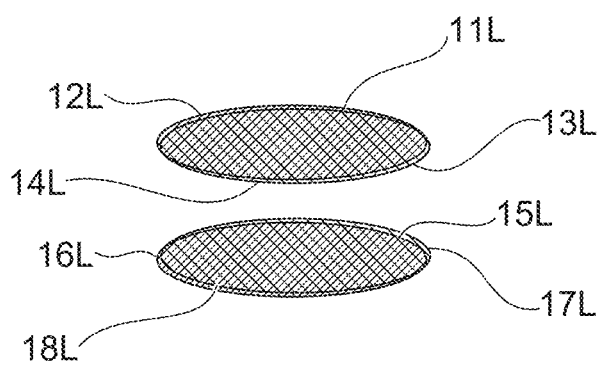
FIG. 5 is a schematic diagram illustrating a light profile according to the first embodiment.

FIG. 5 illustrates the profile of light emitted from the second mirror 32. The first to fourth laser beams 11L to 14L overlap each other. The fifth to eighth laser beams 15L to 18L overlap each other.

Figure 6:
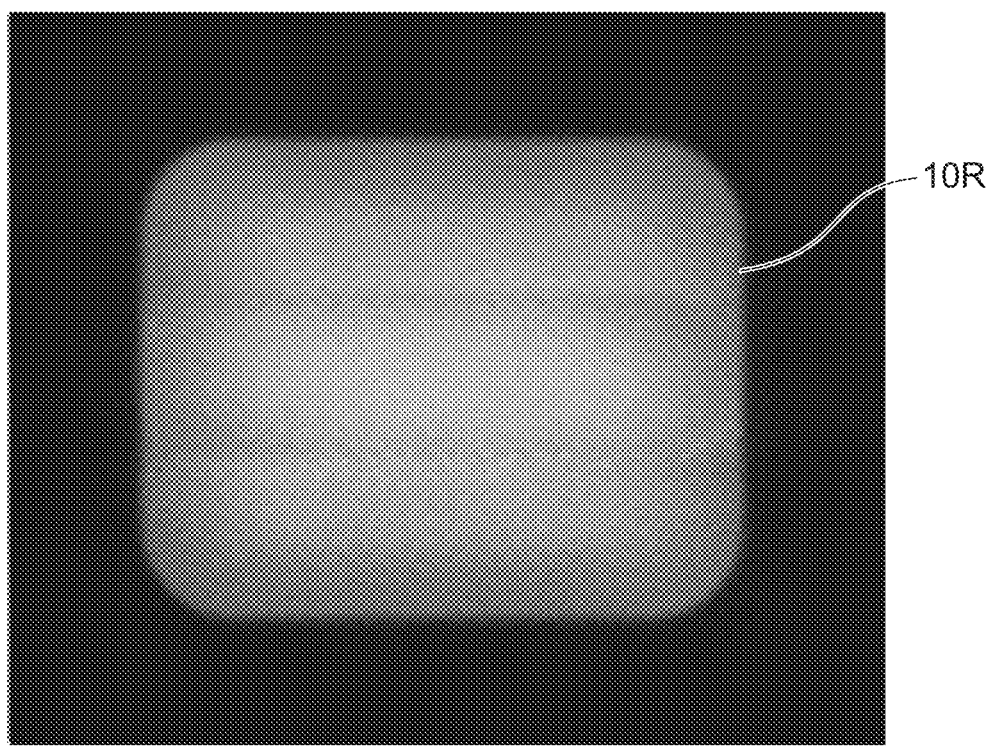
FIG. 6 is a schematic diagram illustrating a light profile according to the first embodiment.
Figure 7:
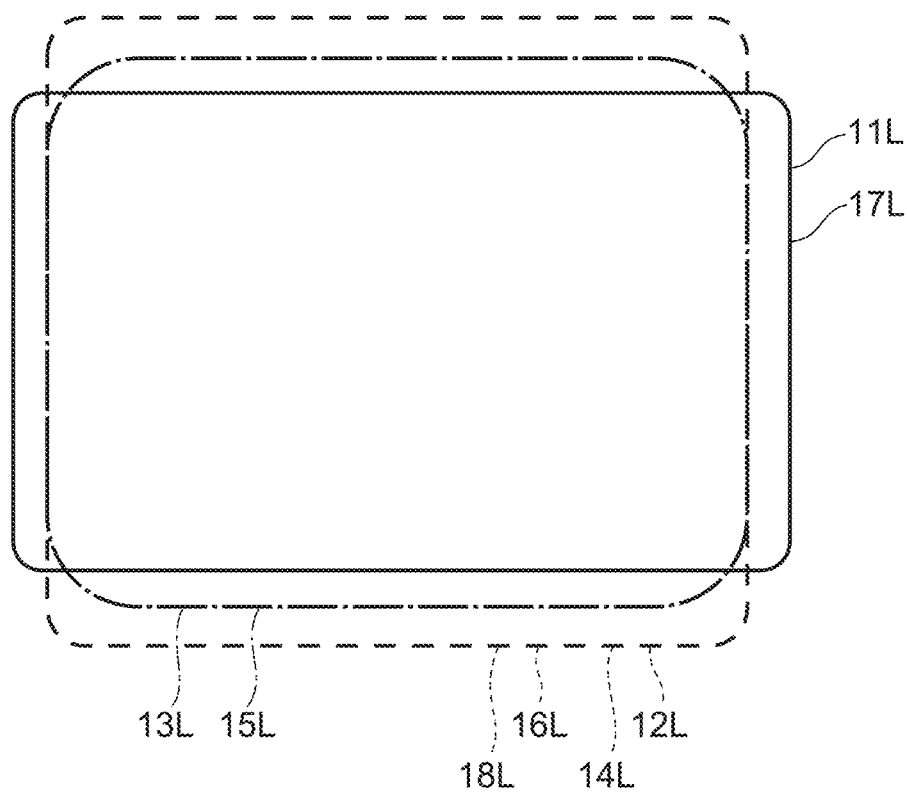
FIG. 7 is a schematic diagram illustrating a light profile according to the first embodiment.

FIGS. 6 and 7 illustrate profiles of light emitted from the light shaping member 40. For example, a light illuminated region 10R including the first to eighth laser beams 11L to 18L has a substantially rectangular (including square) shape.

The light emitted from the light shaping member 40 is substantially white, but is not limited to white. The illuminated region 10R with uniform illuminance is obtained.

As shown in FIGS. 1 and 2, the direction from the fifth region 25 to the sixth region 26 is along a first direction D1. As shown in FIGS. 1 and 3, a direction from the seventh region 27 to the eighth region 28 is along the first direction D1. As shown in FIG. 1, a direction from the seventh region 27 to the fifth region 25 is along a second direction D2. The second direction D2 crosses the first direction D1. A direction from the eighth region 28 to the sixth region 26 is along the second direction D2.

The first direction D1 is defined as an X-axis direction. One direction perpendicular to the X-axis direction is defined as a Z-axis direction. A direction perpendicular to the X-axis direction and the Z-axis direction is defined as a Y-axis direction. The second direction D2 is, for example, the Z-axis direction.

As shown in FIG. 1, a direction from the first light source 11 to the second light source 12 is along the first direction D1. A direction from the third light source 13 to the fourth light source 14 is along the third direction D3. The third direction D3 crosses a plane including the first direction D1 and the second direction D2. The third direction D3 is, for example, the Y-axis direction.

As shown in FIG. 1, a direction from the fifth light source to the sixth light source 16 is along the first direction D1. A direction from the seventh light source 17 to the eighth light source 18 is along the third direction D3. A direction from the fifth light source 15 to the first light source 11 is along the second direction D2. A direction from the sixth light source 16 to the second light source 12 is along the second direction D2. A direction from the seventh light source 17 to the third light source 13 is along the second direction D2. A direction from the eighth light source 18 to the fourth light source 14 is along the second direction D2.

As shown in FIG. 2, the first laser beam 11L is emitted from the first light source 11 along the third direction D3. The second laser beam 12L is emitted from the second light source 12 along the third direction D3. The third laser beam 13L is emitted from the third light source 13 along the first direction D1. The fourth laser beam 14L is emitted from the fourth light source 14 along the first direction D1.

As shown in FIG. 3, the fifth laser beam 15L is emitted from the fifth light source 15 along the third direction D3. The sixth laser beam 16L is emitted from the sixth light source 16 along the third direction D3. The seventh laser beam 17L is emitted from the seventh light source 17 along the first direction D1. The eighth laser beam 18L is emitted from the eighth light source 18 along the first direction D1.

As shown in FIGS. 1 and 2, in this example, a distance between the first light source 11 and the third light source 13 is shorter than a distance between the first light source 11 and the fourth light source 14, and shorter than a distance between the second light source 12 and the third light source 13;

FIGS. 1 and 3, for example, a distance between the fifth light source 15 and the seventh light source 17 is shorter than a distance between the fifth light source 15 and the eighth light source 18, and shorter than a distance between the sixth light source 16 and the seventh light source 17.

In the first embodiment, the first laser beam 11L does not substantially pass through the sixth region 26, the seventh region 27, and the eighth region 28. Alternatively, an intensity of the first laser beam 11L passing through the sixth region 26, the seventh region 27, and the eighth region 28 is lower than an intensity of the first laser beam 11L passing through the fifth region 25.

In the first embodiment, the second laser beam 12L does not substantially pass through the fifth region 25, the seventh region 27, and the eighth region 28. Alternatively, an intensity of the second laser beam 12L passing through the fifth region 25, the seventh region 27, and the eighth region 28 is lower than an intensity of the second laser beam 12L passing through the sixth region 26.

In the first embodiment, the third laser beam 13L does not substantially pass through the sixth region 26, the seventh region 27, and the eighth region 28. Alternatively, an intensity of the third laser beam 13L passing through the sixth region 26, the seventh region 27, and the eighth region 28 is lower than an intensity of the third laser beam 13L passing through the fifth region 25.

In the first embodiment, the fourth laser beam 14L does not substantially pass through the fifth region 25, the seventh region 27, and the eighth region 28. Alternatively, an intensity of the fourth laser beam 14L passing through the fifth region 25, the seventh region 27, and the eighth region 28 is lower than an intensity of the fourth laser beam 14L passing through the sixth region 26.

In the first embodiment, the fifth laser beam 15L does not substantially pass through the fifth region 25, the sixth region 26, and the eighth region 28. Alternatively, an intensity of the fifth laser beam 15L passing through the fifth region 25, the sixth region 26, and the eighth region 28 is lower than an intensity of the fifth laser beam 15L passing through the seventh region 27.

In the first embodiment, the sixth laser beam 16L does not substantially pass through the fifth region 25, the sixth region 26, and the seventh region 27. Alternatively, an intensity of the sixth laser beam 16L passing through the fifth region 25, the sixth region 26, and the seventh region 27 is lower than an intensity of the sixth laser beam 16L passing through the eighth region 28.

In the first embodiment, the seventh laser beam 17L does not substantially pass through the fifth region 25, the sixth region 26, and the eighth region 28. Alternatively, an intensity of the seventh laser beam 17L passing through the fifth region 25, the sixth region 26, and the eighth region 28 is lower than an intensity of the seventh laser beam 17L passing through the seventh region 27.

In the first embodiment, the eighth laser beam 18L does not substantially pass through the fifth region 25, the sixth region 26, and the seventh region 27. Alternatively, an intensity of the eighth laser beam 18L passing through the fifth region 25, the sixth region 26, and the seventh region 27 is lower than an intensity of the eighth laser beam 18L passing through the eighth region 28.

As shown in FIGS. 1 to 3, the light source part 10 may include a first sealing member 11M, a second sealing member 12M, a third sealing member 13M and a fourth sealing member 14M. The first light source 11 and the fifth light source 15 are sealed by the first sealing member 11M. The second light source 12 and the sixth light source 16 are sealed by the second sealing member 12M. The third light source 13 and the seventh light source 17 are sealed by the third sealing member 13M. The fourth light source 14 and the eighth light source 18 are sealed by the fourth sealing member 14M. The first sealing member 11M, the second sealing member 12M, the third sealing member 13M and the fourth sealing member 14M are separated from each other.

It is preferable that the first sealing member 11M, the second sealing member 12M, the third sealing member 13M and the fourth sealing member 14M are separated from each other. The first sealing member 11M and the second sealing member 12M may be in contact with each other. The first sealing member 11M and the second sealing member 12M may be integrally formed. The third sealing member 13M and the fourth sealing member 14M may be in contact with each other. The third sealing member 13M and the fourth sealing member 14M may be integrally formed.

Figure 8:
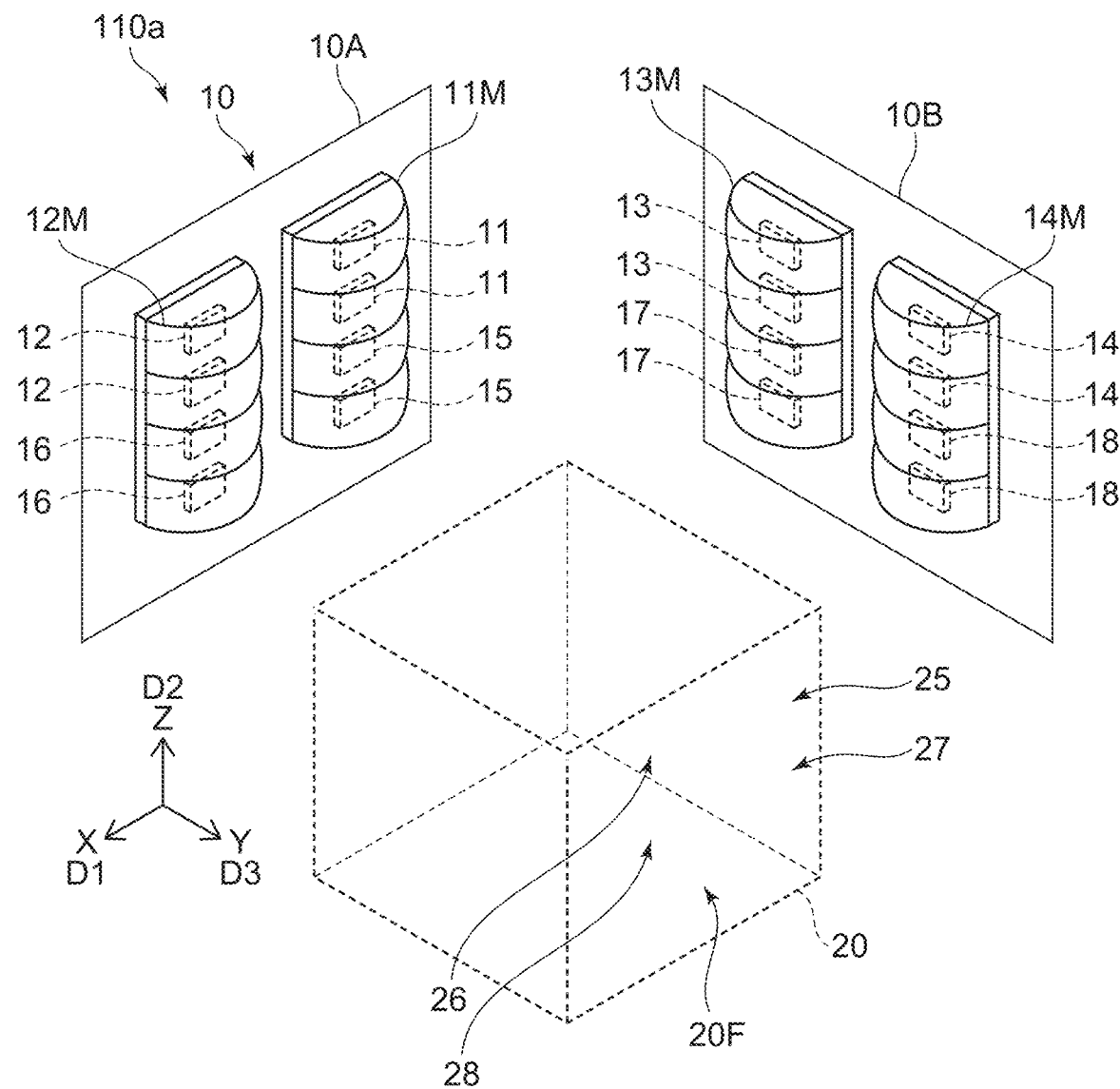
FIG. 8 is a schematic perspective diagram illustrating another light source device according to the first embodiment.

FIG. 8 is a schematic perspective diagram illustrating a light source device 110a according to the first embodiment.

As shown in FIG. 8, in the light source device 110a according to the first embodiment, the light source part 10 may include multiple first light sources 11 and multiple third light sources 13. A direction from one of the multiple first light sources 11 to another one of the multiple first light sources 11 is along the second direction D2. A direction from one of the multiple third light sources 13 to another one of the multiple third light sources 13 is along the second direction D2.

As shown in FIG. 8, the light source part 10 may include multiple fifth light sources 15 and multiple seventh light sources 17. A direction from one of the multiple fifth light sources 15 to another one of the multiple fifth light sources 15 is along the second direction D2. A direction from one of the multiple seventh light sources 17 to another one of the multiple seventh light sources 17 is along the second direction D2. Except for the above, the configuration of the light source device 110a may be the same as the configuration of the light source device 110. The light source device 110a can also provide a light source device capable of uniforming the illuminance distribution.

Figure 9:
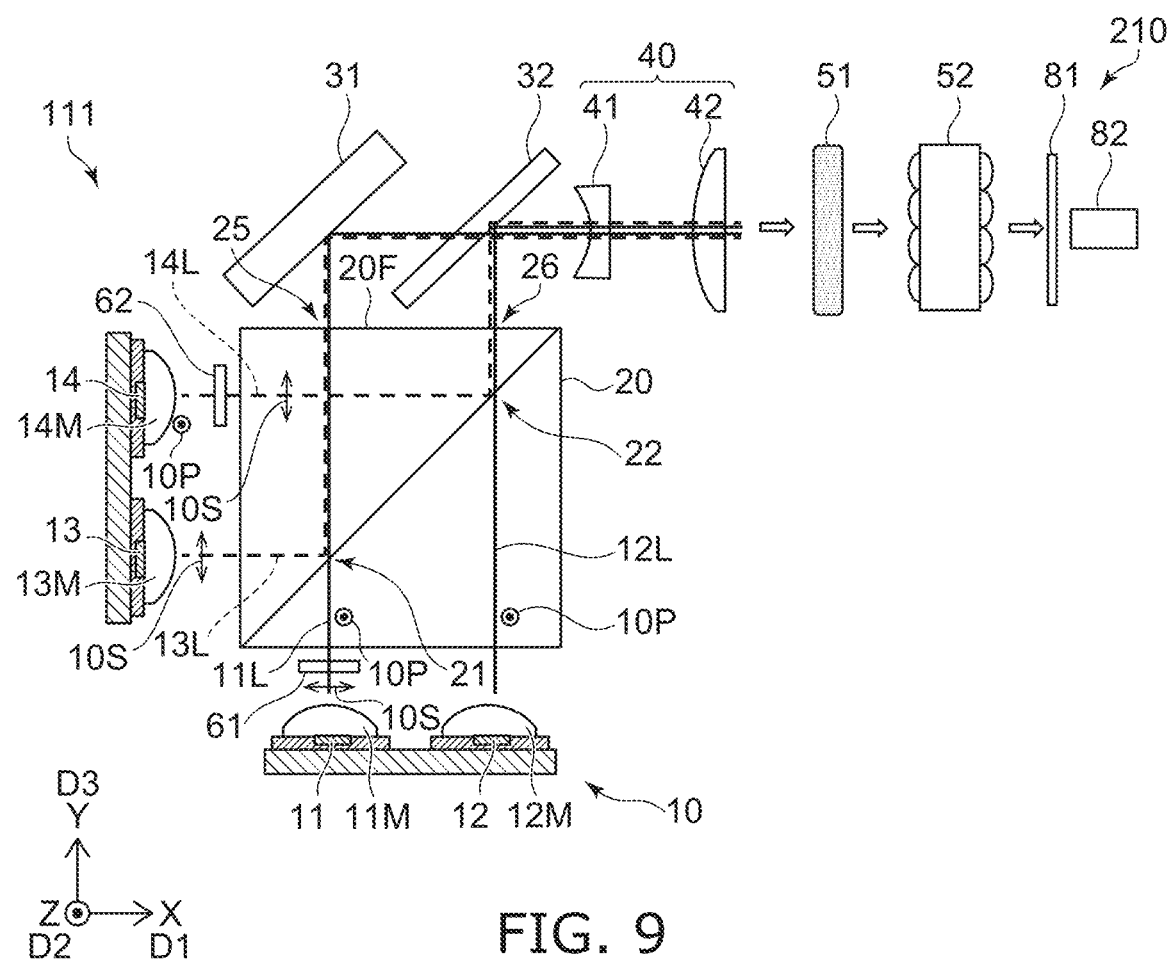
FIG. 9 is a schematic diagram illustrating a part of another light source device and the display device according to the first embodiment.
Figure 10:
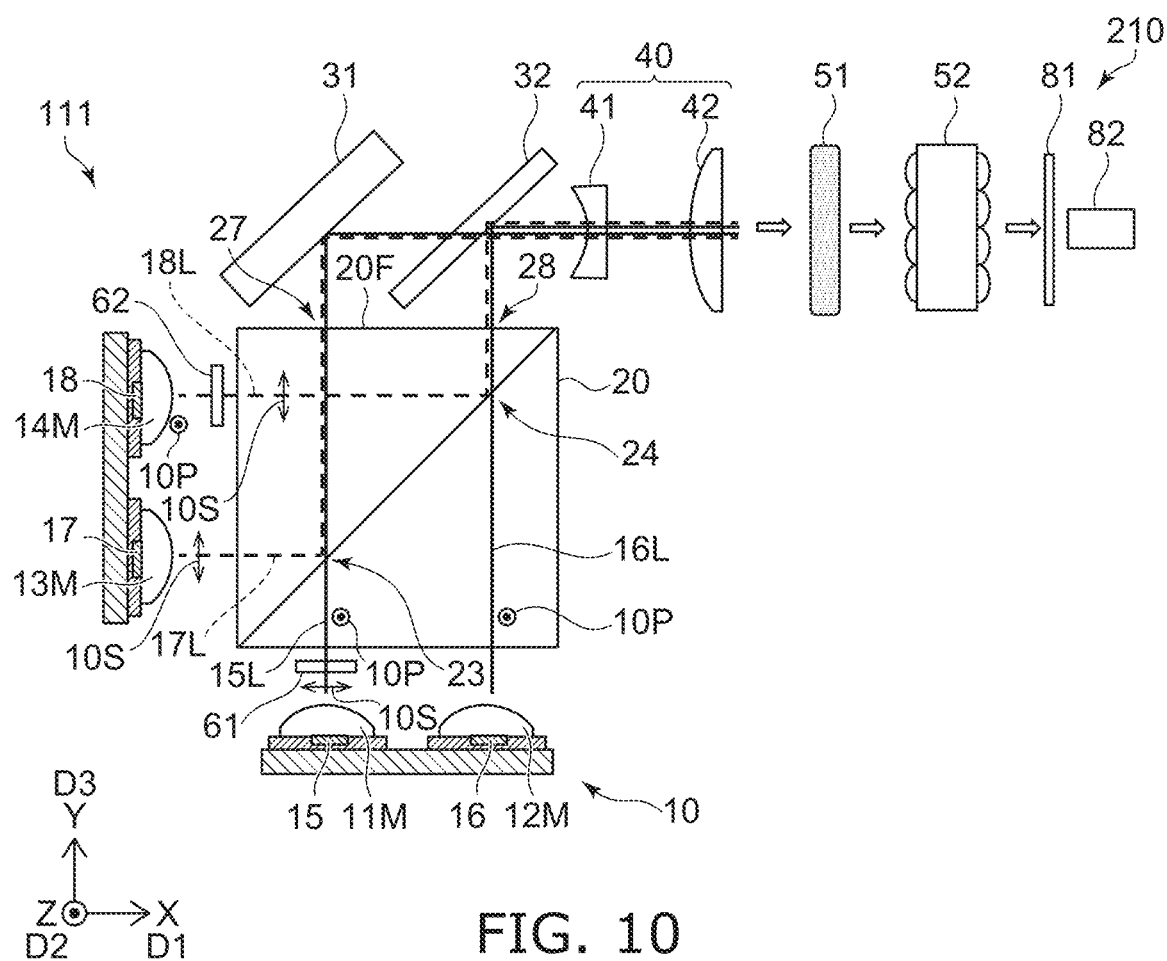
FIG. 10 is a schematic diagram illustrating another part of light source device depicted in FIG. 9 and the display device according to the first embodiment.

FIGS. 9 and 10 are schematic views illustrating a light source device 111 and the display device 210 according to the first embodiment As shown in FIG. 9, in the light source device 111 according to the first embodiment, the first laser beam 11L incident on the first region 21 is P-polarized light 10P. The second laser beam 12L incident on the second region 22 is P-polarized light 10P. In this example, the first laser beam 11L emitted from the first light source 11 passes through a phase element 61 and enters the first region 21. The first laser beam 11L emitted from the first light source 11 is S-polarized light 10S, and becomes P-polarized light 10P by passing through the phase element 61. The phase element 61 is, for example, a λ/2 plate.

The vibration direction of the electric field in the P-polarized light 10P is along the second direction D2. The vibration direction of the electric field in the S-polarized light 10S is perpendicular to the traveling direction of the light, and crosses (for example, orthogonally) the vibration direction of the electric field in the P-polarized light 10P.

As shown in FIG. 9, the third laser beam 13L incident on the first region 21 is S-polarized light 10S. The fourth laser beam 14L incident on the second region 22 is S-polarized light 10S. In this example, the fourth laser beam 14L emitted from the fourth light source 14 passes through a phase element 62 and enters the second region 22. The fourth laser beam 14L emitted from the fourth light source 14 is P-polarized light 10P, and becomes S-polarized light 10S by passing through the phase element 62. The phase element 62 is, for example, a λ/2 plate.

As shown in FIG. 10, the fifth laser beam 15L incident on the third region 23 is P-polarized light 10P. The sixth laser beam 16L incident on the fourth region 24 is P-polarized light 10P. In this example, the fifth laser beam 15L emitted from the fifth light source 15 passes through the phase element 61 and enters the third region 23. The fifth laser beam 15L emitted from the fifth light source 15 is S-polarized light 10S, and becomes P-polarized light 10P by passing through the phase element 61.

As shown in FIG. 10, the seventh laser beam 17L incident on the third region 23 is S-polarized light 10S. The eighth laser beam 18L incident on the fourth region 24 is S-polarized light 10S. In this example, the eighth laser beam 18L emitted from the eighth light source 18 passes through the phase element 62 and enters the fourth region 24. The eighth laser beam 18L emitted from the eighth light source 18 is P-polarized light 10P, and becomes S-polarized light 10S by passing through the phase element 62.

When light sources having different polarizations are used, by providing the phase element as described above, the polarization can be aligned and the polarization multiplexing member 20 can be used to multiplex the polarization.

Figure 11:
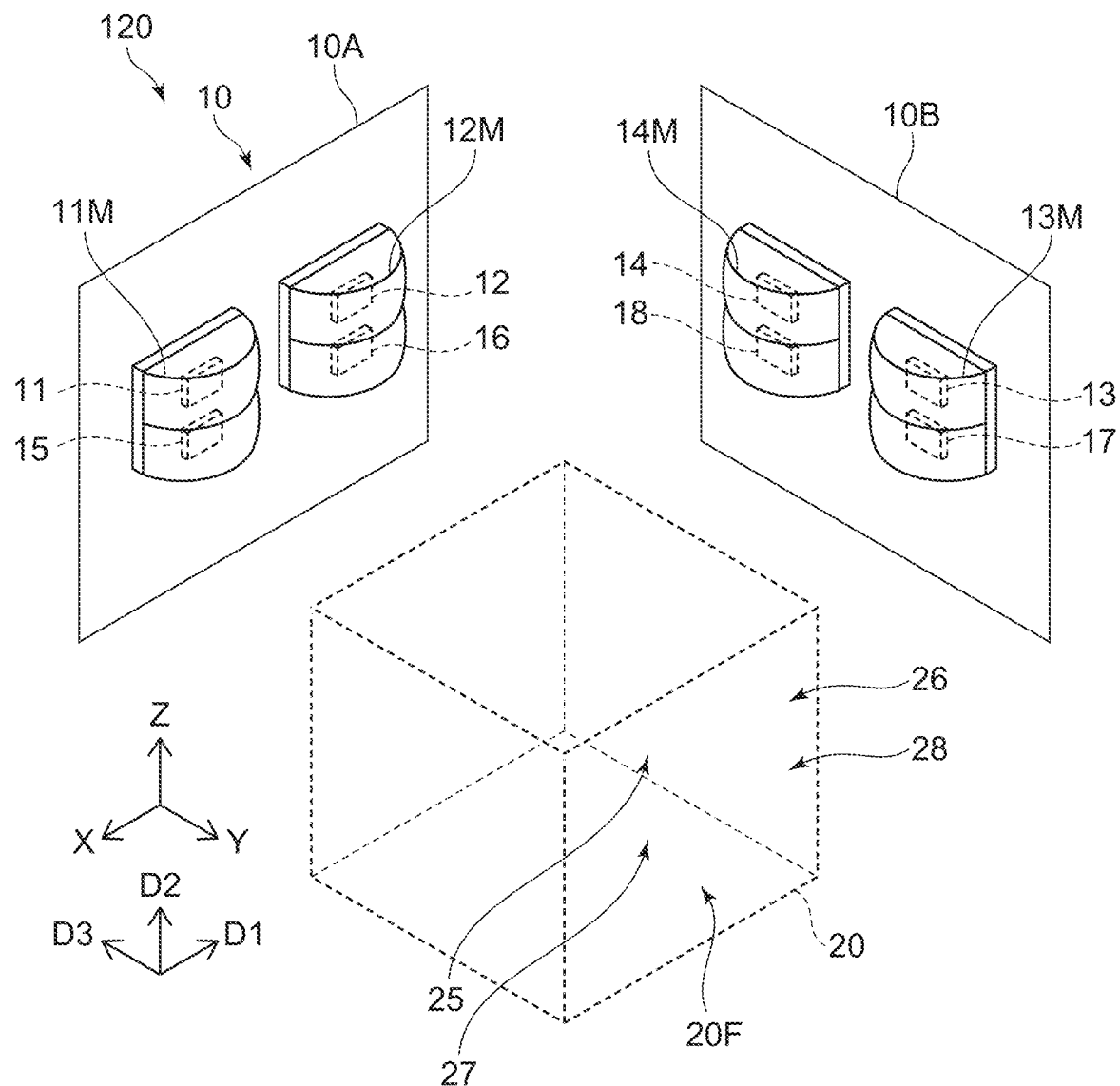
FIG. 11 is a schematic perspective diagram illustrating another light source device according to the first embodiment.

FIG. 11 is a schematic perspective diagram illustrating a light source device 120 according to the first embodiment.

Figure 12:
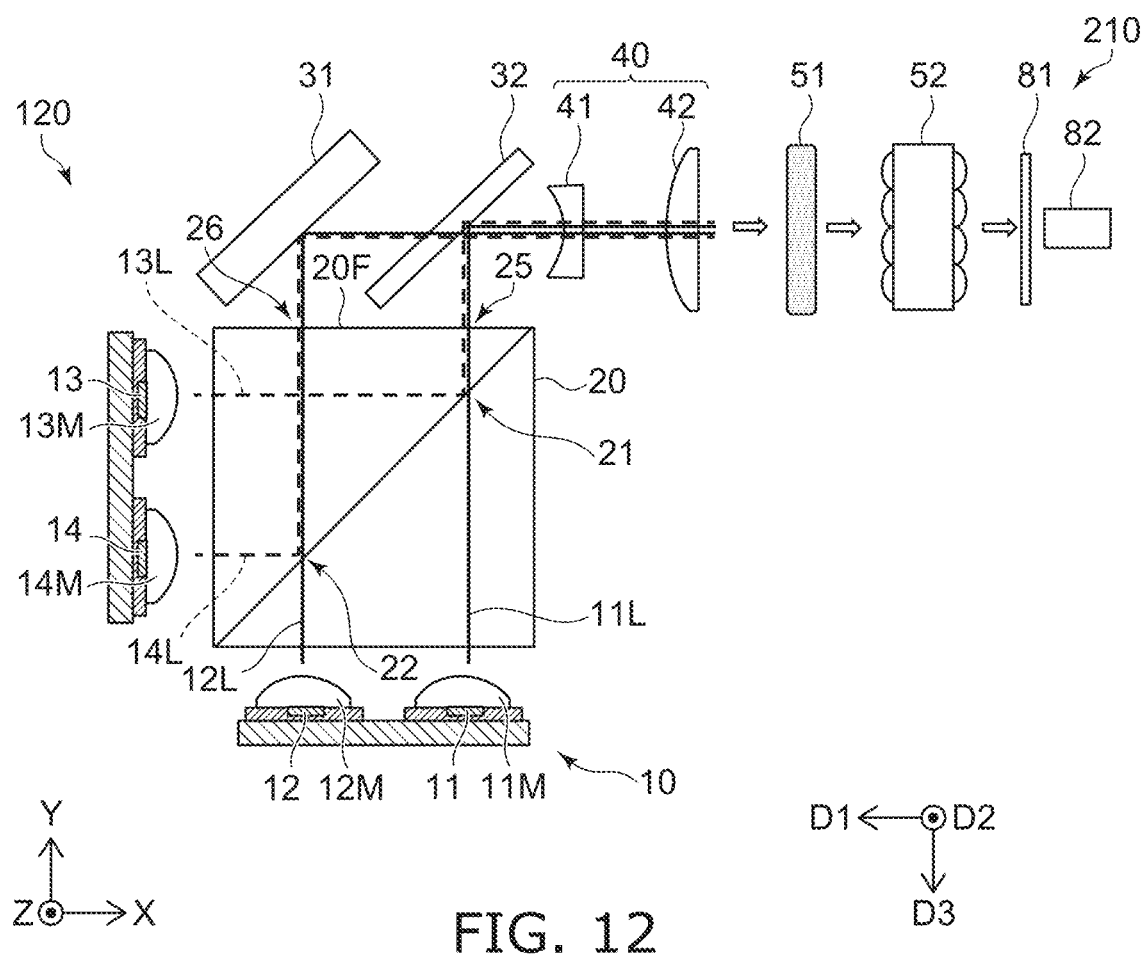
FIG. 12 is a schematic diagram illustrating a part of the light source device depicted in FIG. 11 and the display device according to the first embodiment.
Figure 13:
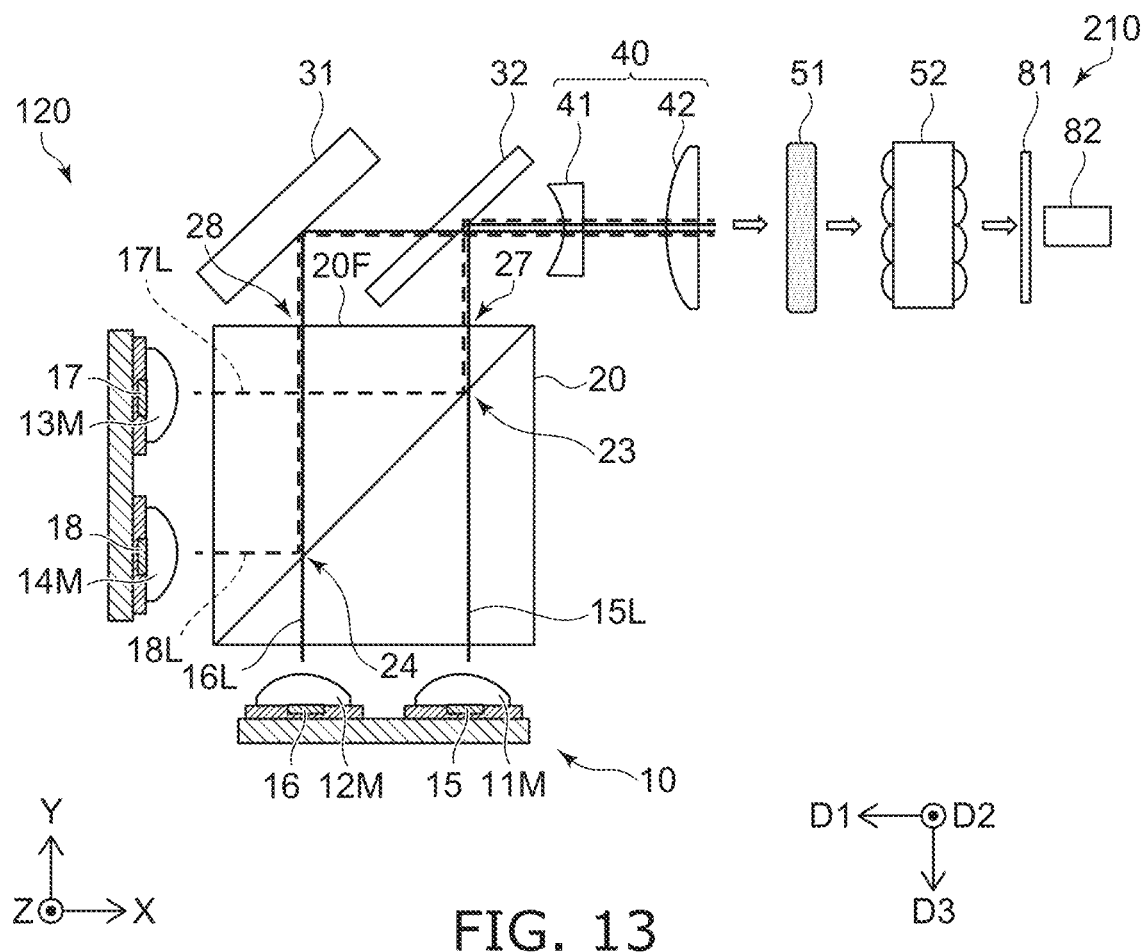
FIG. 13 is a schematic diagram illustrating another part of light source device depicted in FIG. 12 and the display device according to the first embodiment.

FIGS. 12 and 13 are schematic diagrams illustrating the light source device 120 and the display device 210 according to the first embodiment.

FIGS. 12 and 13 illustrate plan views.

As shown in FIGS. 11 to 13, the light source device 120 according to the first embodiment also includes the light source part 10 and the polarization multiplexing member 20. In the light source device 120, the positions of the light sources with different wavelengths are different from those in the light source device 110. Except for this, the configuration of the light source device 120 may be the same as the configuration of the light source device 110.

As shown in FIGS. 11 and 12, in the light source device 120, a distance between the second light source 12 and the fourth light source 14 is shorter than a distance between the second light source 12 and the third light source 13, and shorter than a distance between the first light source 11 and the fourth light source 14.

As shown in FIGS. 11 and 13, in the light source device 120, a distance between the sixth light source 16 and the eighth light source 18 is shorter than a distance between the sixth light source 16 and the seventh light source 17, and shorter than a distance between the fifth light source 15 and the eighth light source 18.

As shown in FIG. 12, in the light source device 120, the first laser beam 11L passes through the first region 21. The second laser beam 12L passes through the second region 22. The third laser beam 13L is reflected by the first region 21. The fourth laser beam 14L is reflected by the second region 22.

As shown in FIG. 13, the fifth laser beam 15L passes through the third region 23. The sixth laser beam 16L passes through the fourth region 24. The seventh laser beam 17L is reflected by the third region 23. The eighth laser beam 18L is reflected by the fourth region 24.

As shown in FIG. 12, in the light source device 120, the first laser beam 11L and the third laser beam 13L are emitted from the fifth region 25. The second laser beam 12L and the fourth laser beam 14L are emitted from the sixth region 26. As shown in FIG. 13, the fifth laser beam 15L and the seventh laser beam 17L are emitted from the seventh region 27. The sixth laser beam 16L and the eighth laser beam 18L are emitted from the eighth region 28.

Uniform angular multiplexing is also obtained in the light source device 120. A compact device can suppress speckle. A light source device capable of uniforming the illuminance distribution can be provided.

Figure 14:
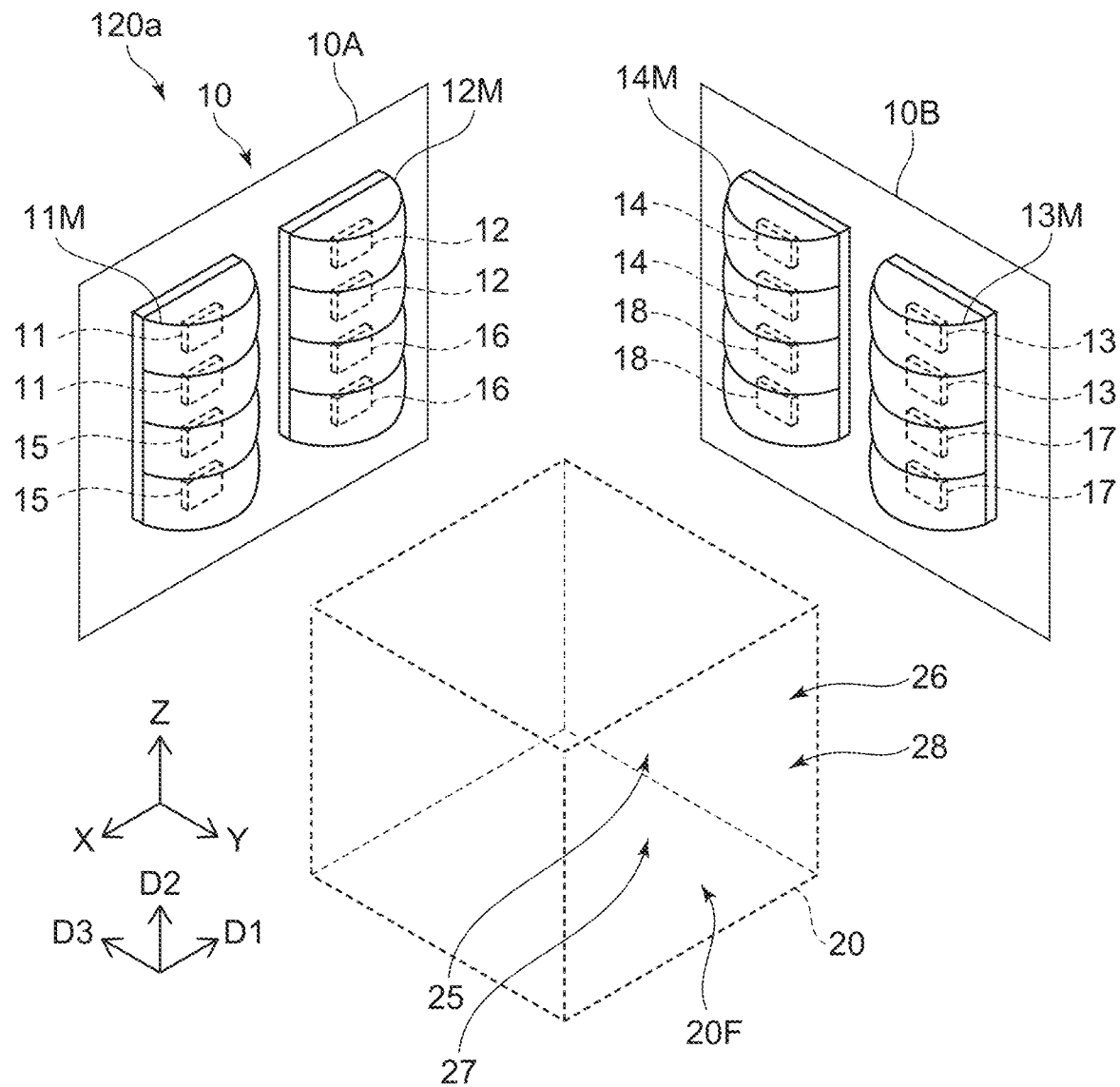
FIG. 14 is a schematic perspective diagram illustrating another light source device according to the first embodiment.

FIG. 14 is a schematic perspective diagram illustrating a light source device 120a according to the first embodiment.

As shown in FIG. 14, in the light source device 120a according to the first embodiment, the light source part 10 may include multiple first light sources 11 and multiple third light sources 13. A direction from one of the multiple first light sources 11 to another one of the multiple first light sources 11 is along the second direction D2. A direction from one of the multiple third light sources 13 to another one of the multiple third light sources 13 is along the second direction D2.

As shown in FIG. 14, the light source part 10 may include multiple fifth light sources 15 and multiple seventh light sources 17. A direction from one of the multiple fifth light sources 15 to another one of the multiple fifth light sources 15 is along the second direction D2. A direction from one of the multiple seventh light sources 17 to another one of the multiple seventh light sources 17 is along the second direction D2. Except for the above, the configuration of the light source device 120a may be the same as the configuration of the light source device 120. Even in the light source device 120a, uniform angular multiplexing is obtained. A compact device can suppress speckle. A light source device capable of uniforming the illuminance distribution can be provided.

In the light source devices 110a and 120a, multiple second light sources 12, multiple fourth light sources 14, multiple sixth light sources 16, and multiple eighth light sources 18 may be provided. A direction from one of the multiple second light sources 12 to another one of the multiple second light sources 12 is along the second direction D2. A direction from one of the multiple fourth light sources 14 to another one of the multiple fourth light sources 14 is along the second direction D2. A direction from one of the multiple sixth light sources 16 to another one of the multiple sixth light sources 16 is along the second direction D2. A direction from one of the multiple eighth light sources 18 to another one of the multiple eighth light sources 18 is along the second direction D2.

Figure 15:
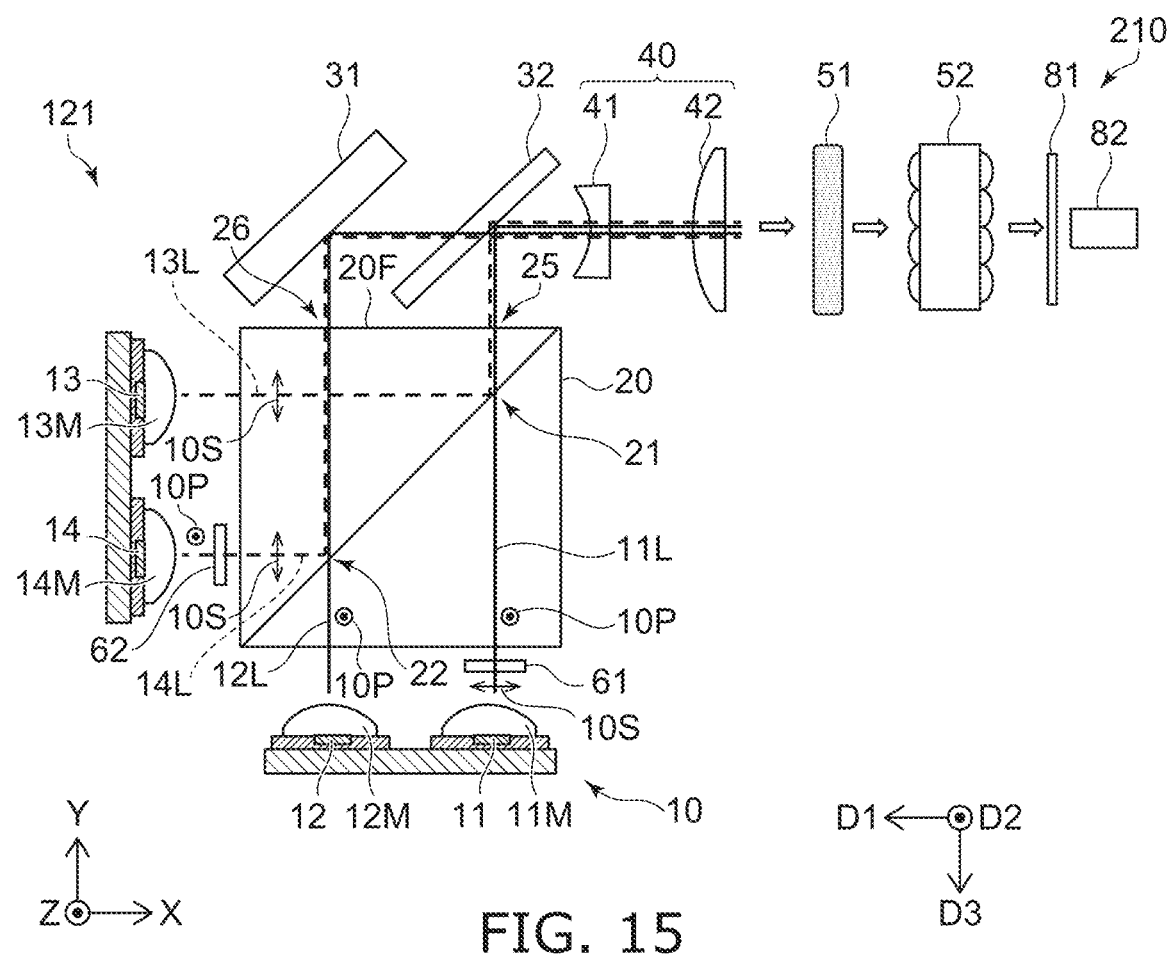
FIG. 15 is a schematic diagram illustrating a part of another light source device and the display device according to the first embodiment.
Figure 16:
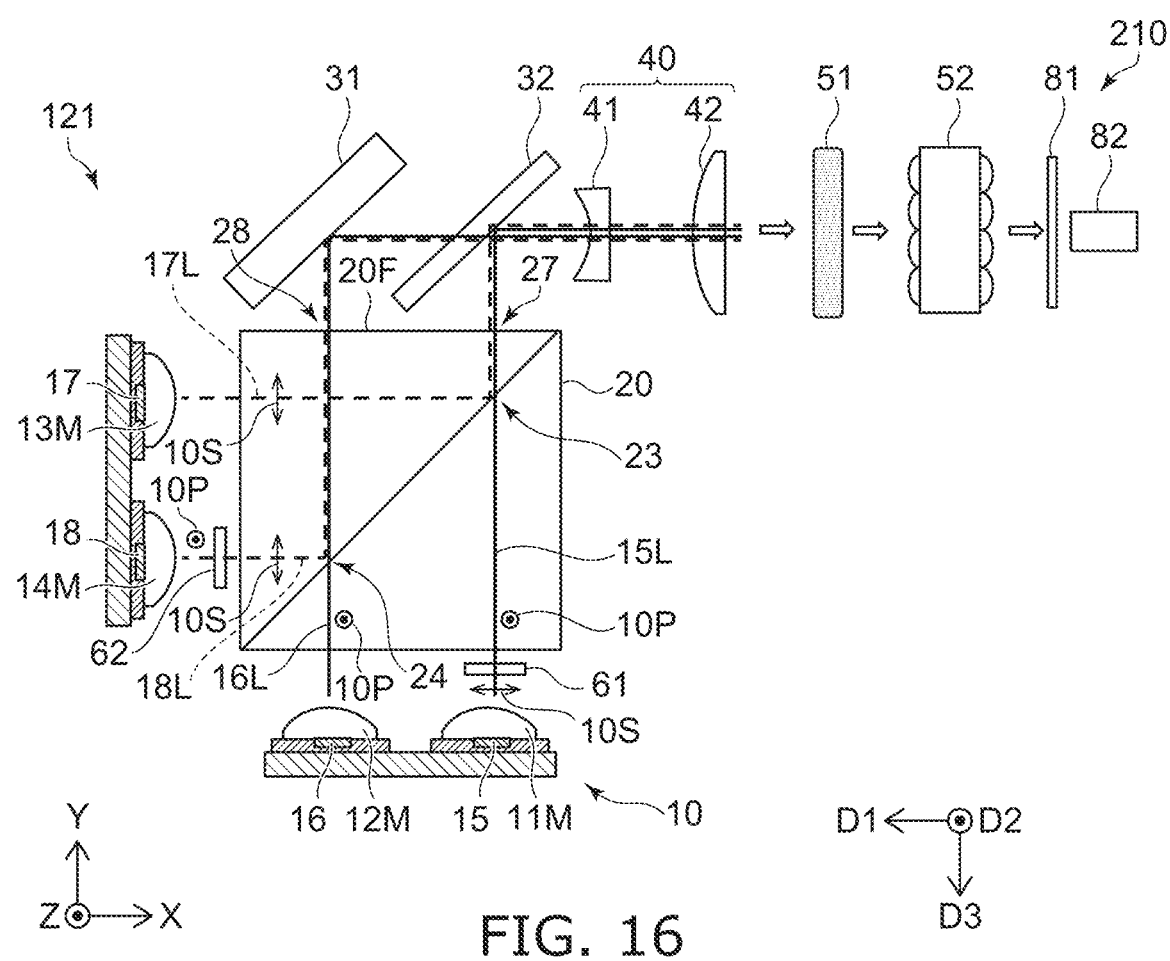
FIG. 16 is a schematic diagram illustrating another part of the light source device depicted in FIG. 15 and the display device according to the first embodiment.

FIGS. 15 and 16 are schematic diagrams illustrating a light source device 121 and the display device 210 according to the first embodiment.

As shown in FIG. 15, in the light source device 121 according to the first embodiment, the first laser beam 11L emitted from the first light source 11 passes through the phase element 61 (for example, a λ/2 plate) and enters the first region 21. The fourth laser beam 14L emitted from the fourth light source 14 may pass through the phase element 62 (for example, a λ/2 plate) and enter the second region 22. As shown in FIG. 16, the fifth laser beam 15L emitted from the fifth light source may pass through the phase element 61 and enter the third region 23. The eighth laser beam 18L emitted from the eighth light source 18 may pass through the phase element 62 and enter the fourth region 24.

Figure 17:
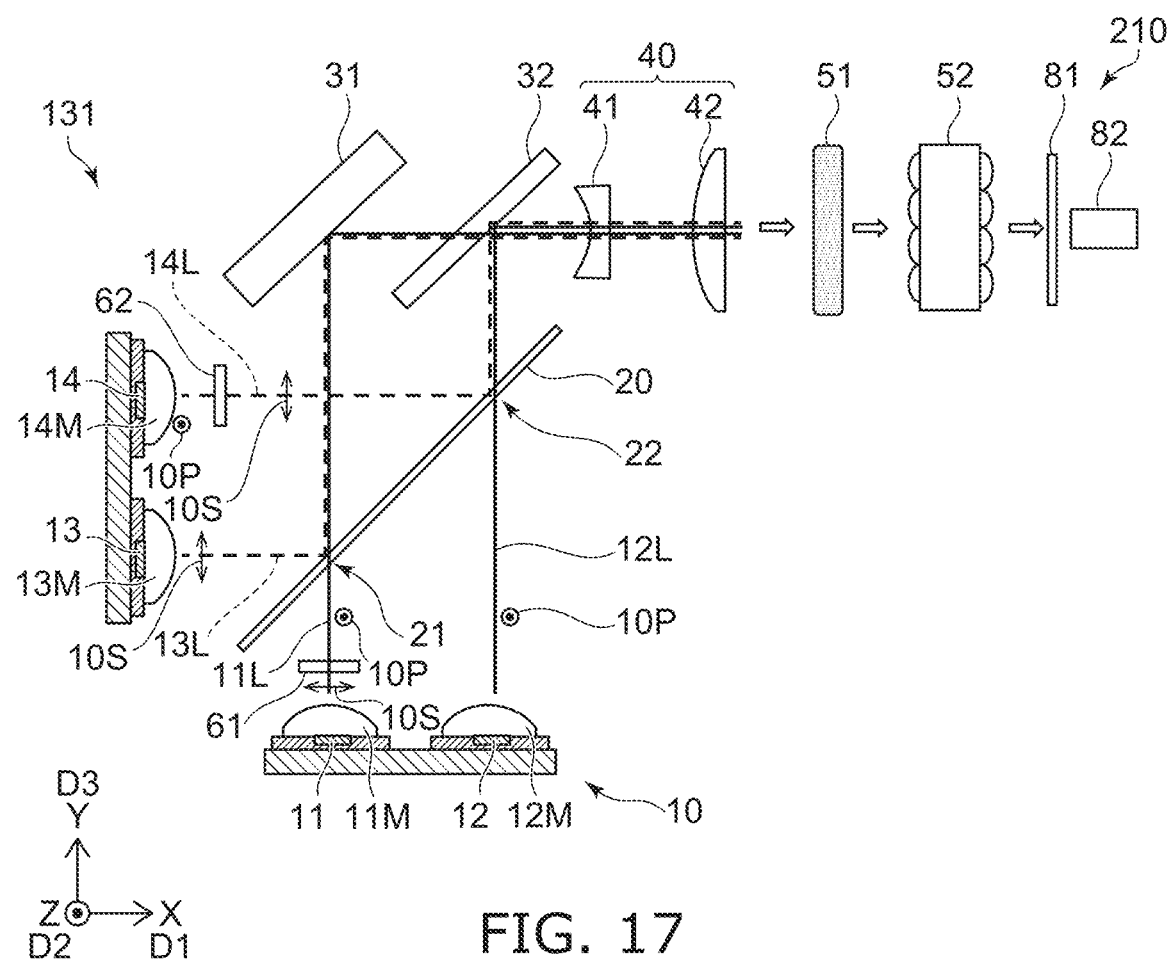
FIG. 17 is a schematic diagram illustrating a part of another light source device and the display device according to the first embodiment.
Figure 18:
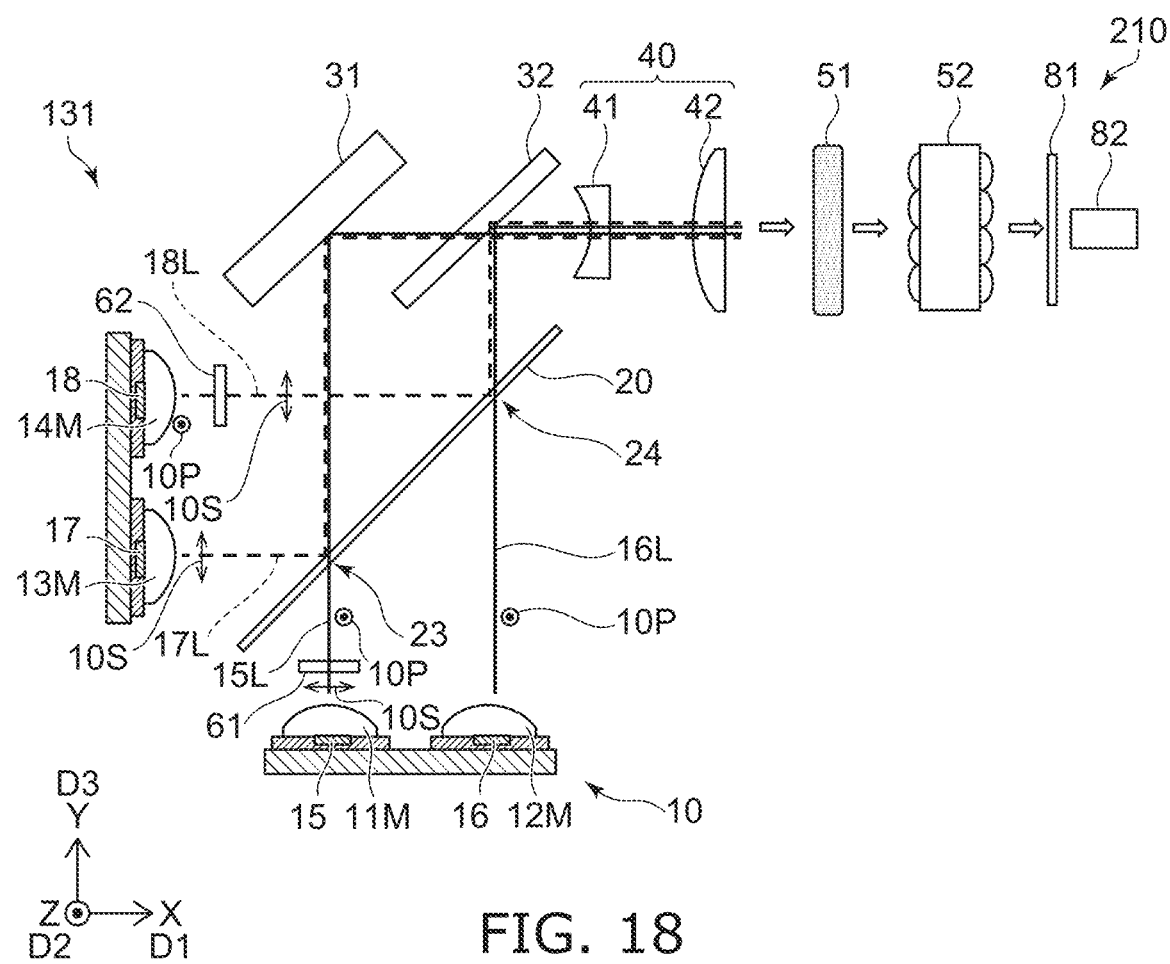
FIG. 18 is a schematic diagram illustrating another part of the light source device depicted in FIG. 17 and the display device according to the first embodiment.

FIGS. 17 and 18 are schematic diagrams illustrating a light source device 131 and the display device 210 according to the first embodiment.

As shown in FIGS. 17 and 18, in the light source device 131 according to the first embodiment, the polarization multiplexing member 20 is a polarizing element. The polarizing element is, for example, a reflective polarizing plate including a wire grid polarizer. Also in the light source device 131, the polarization multiplexing member 20 includes first to fourth regions 21 to 24. The first laser beam 11L passes through the first region 21. The second laser beam 12L passes through the second region 22. The third laser beam 13L is reflected by the first region 21. The fourth laser beam 14L is reflected by the second region 22. The fifth laser beam 15L passes through the third region 23. The sixth laser beam 16L passes through the fourth region 24. The seventh laser beam 17L is reflected by the third region 23. The eighth laser beam 18L is reflected by the fourth region 24.

In the light source device 131, a distance between the first light source 11 and the third light source 13 is shorter than a distance between the first light source 11 and the fourth light source 14 and shorter than a distance between the second light source 12 and the third light source 13 is shorter.

Figure 19:
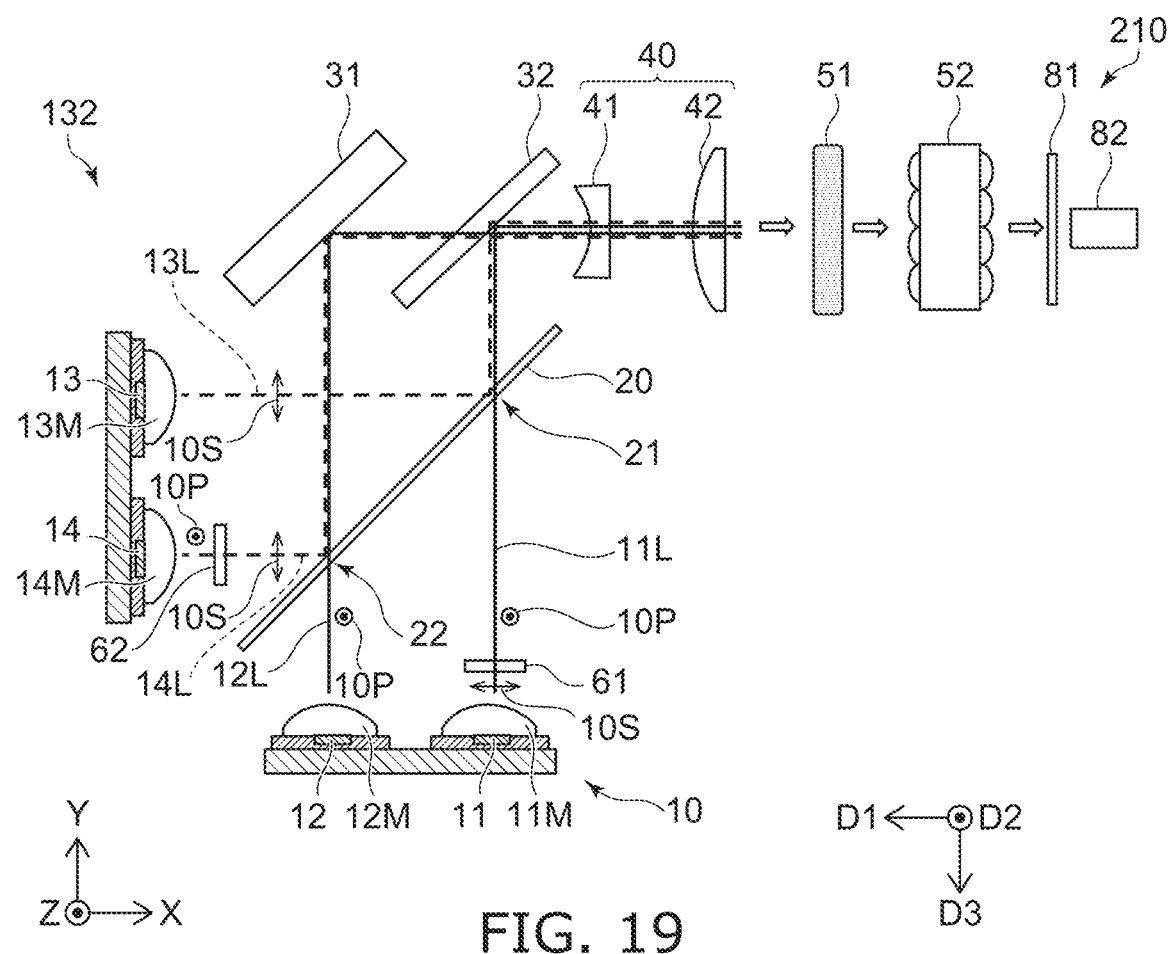
FIG. 19 is a schematic diagram illustrating a part of another light source device and the display device according to the first embodiment.
Figure 20:
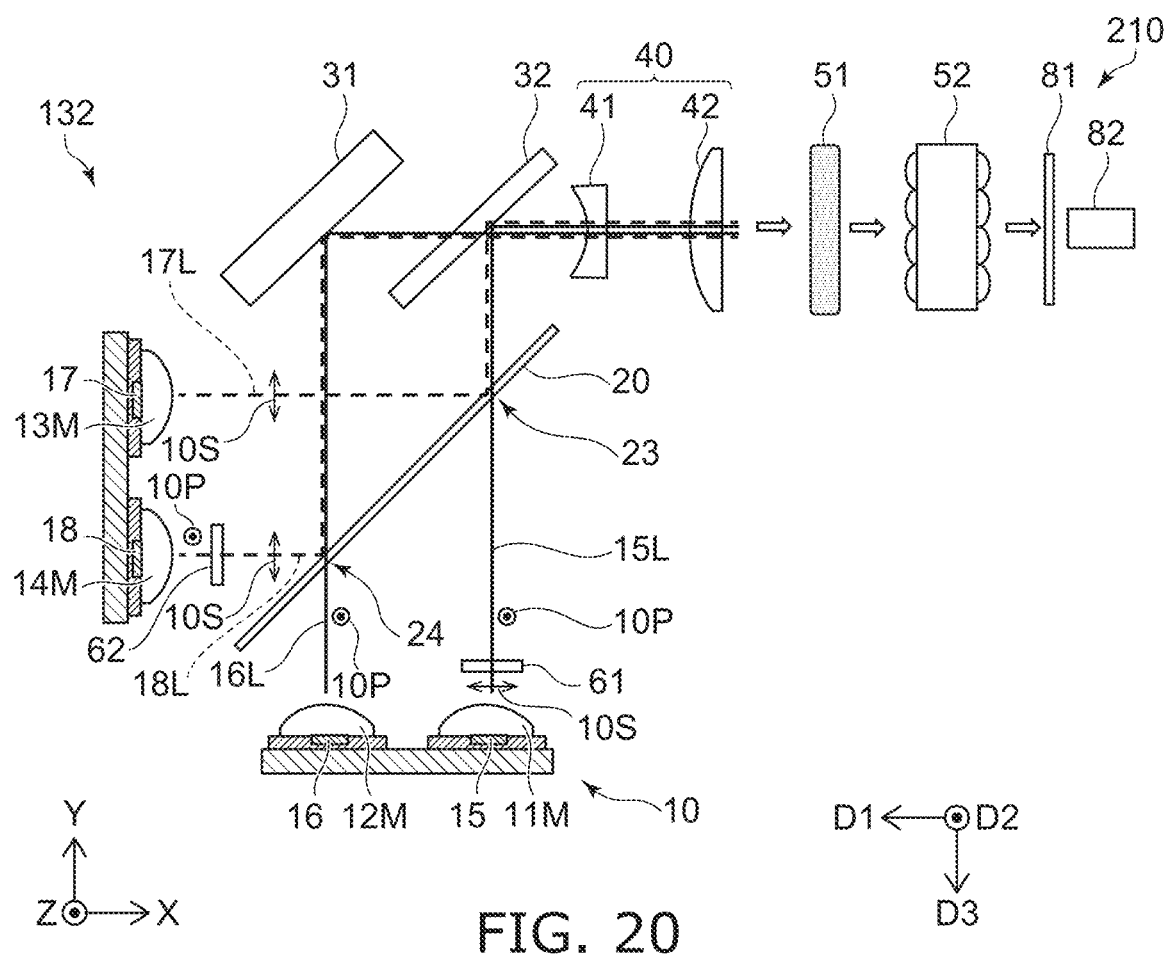
FIG. 20 is a schematic diagram illustrating another part of the light source device depicted in FIG. 19 and the display device according to the first embodiment.

FIGS. 19 and 20 are schematic diagrams illustrating a light source device 132 and the display device 210 according to the first embodiment.

As shown in FIGS. 19 and 20, in the light source device 132 according to the first embodiment, the polarization multiplexing member 20 is a polarizing element (for example, a reflective polarizing plate including a wire grid polarizer). In the light source device 131, the first laser beam 11L passes through the first region 21. The second laser beam 12L passes through the second region 22. The third laser beam 13L is reflected by the first region 21. The fourth laser beam 14L is reflected by the second region 22. The fifth laser beam 15L passes through the third region 23. The sixth laser beam 16L passes through the fourth region 24. The seventh laser beam 17L is reflected by the third region 23. The eighth laser beam 18L is reflected by the fourth region 24.

In the light source device 132, a distance between the second light source 12 and the fourth light source 14 is shorter than a distance between the second light source 12 and the third light source 13, and shorter than a distance between the first light source 11 and the fourth light source 14.

In the light source devices 131 and 132, the first direction D1 may be the direction from the first light source 11 to the second light source 12. The second direction D2 may be the direction from the fifth light source 15 to the first light source 11. The third direction D3 may be the direction from the third light source 13 to the fourth light source 14.

In the light source devices 131 and 132, the arrangement of light sources with different wavelengths is reversed. Such a configuration makes it easy to obtain uniform light. According to the present embodiment, a light source device capable of uniforming the illuminance distribution is provided.

Second Embodiment

Figure 21:
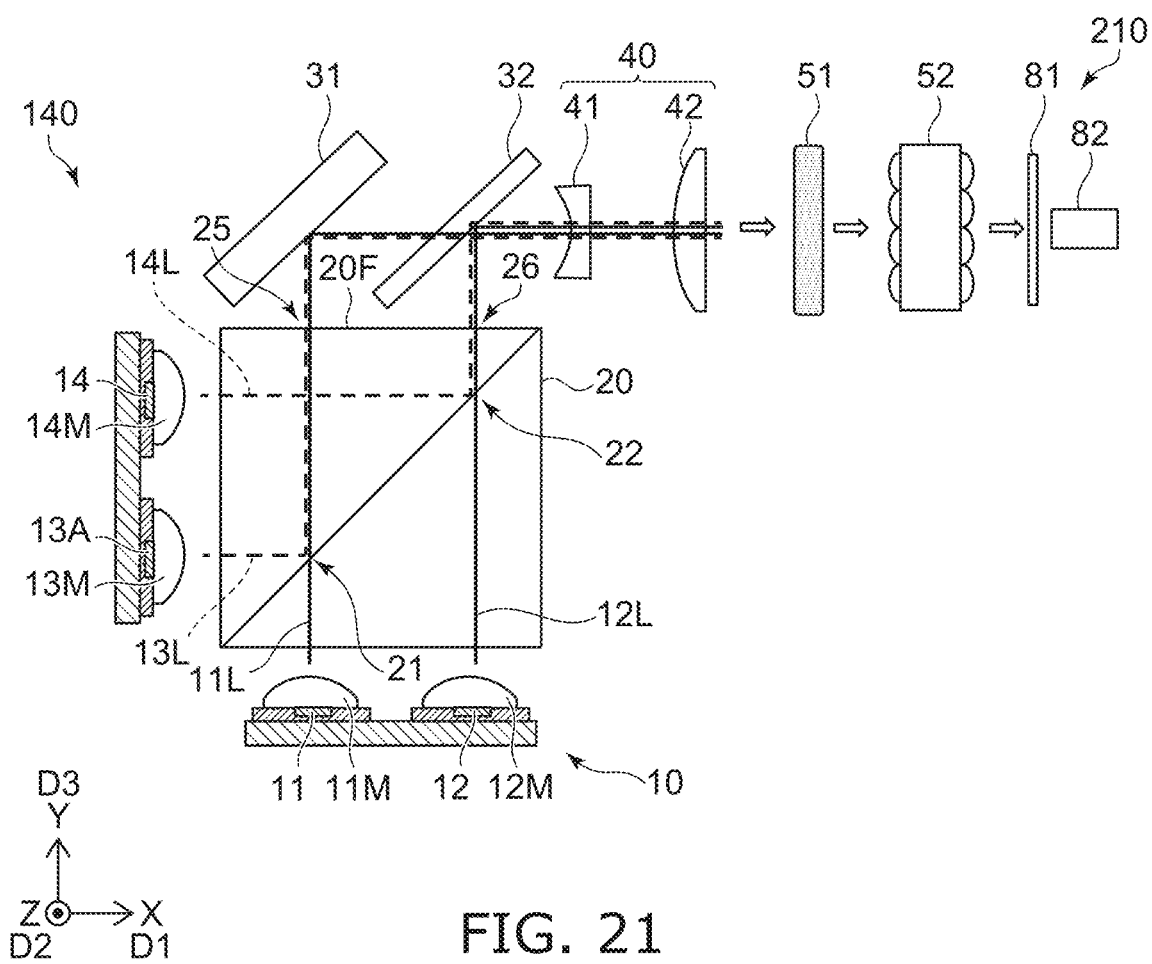
FIG. 21 is a schematic diagram illustrating a part of a light source device and the display device according to the second embodiment.

FIG. 21 is a schematic diagram illustrating a light source device 140 and the display device 210 according to a second embodiment.

As shown in FIG. 21, the light source device 140 according to the embodiment includes the polarization multiplexing member 20 and the light source part 10. The polarization multiplexing member 20 includes the first region 21 and the second region 22.

The light source part 10 includes the first light source 11, the second light source 12, a third light source 13A and the fourth light source 14. The first light source 11 emits the first laser beam 11L having the first peak wavelength. The second light source 12 emits the second laser beam 12L having the second peak wavelength. The second peak wavelength is different from the first peak wavelength. The third light source 13A emits the third laser beam 13L having the first peak wavelength. The fourth light source 14 emits the fourth laser beam 14L having the second peak wavelength.

The first laser beam 11L passes through the first region 21. The second laser beam 12L passes through the second region 22. The third laser beam 13L is reflected by the first region 21. The fourth laser beam 14L is reflected by the second region 22.

In the light source device 140, a distance between the first light source 11 and the third light source 13A is shorter than a distance between the first light source 11 and the fourth light source 14, and shorter than a distance between the second light source 12 and the third light source 13A.

In the light source device 140, the arrangement of light sources with different wavelengths is reversed. Such a configuration makes it easy to obtain uniform light. According to the present embodiment, a light source device capable of uniforming the illuminance distribution is provided.

Figure 22:
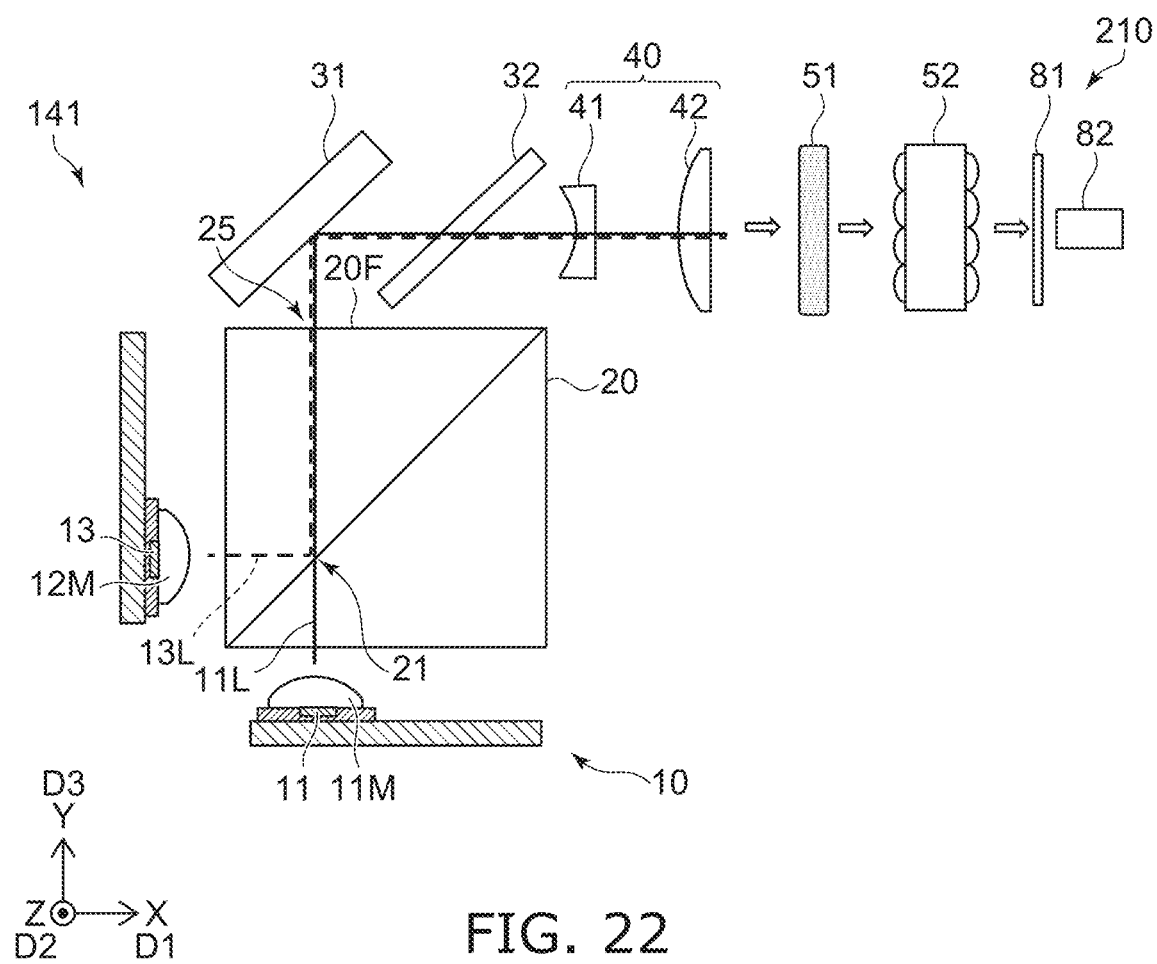
FIG. 22 is a schematic diagram illustrating a part of another light source device and the display device according to the second embodiment.
Figure 23:
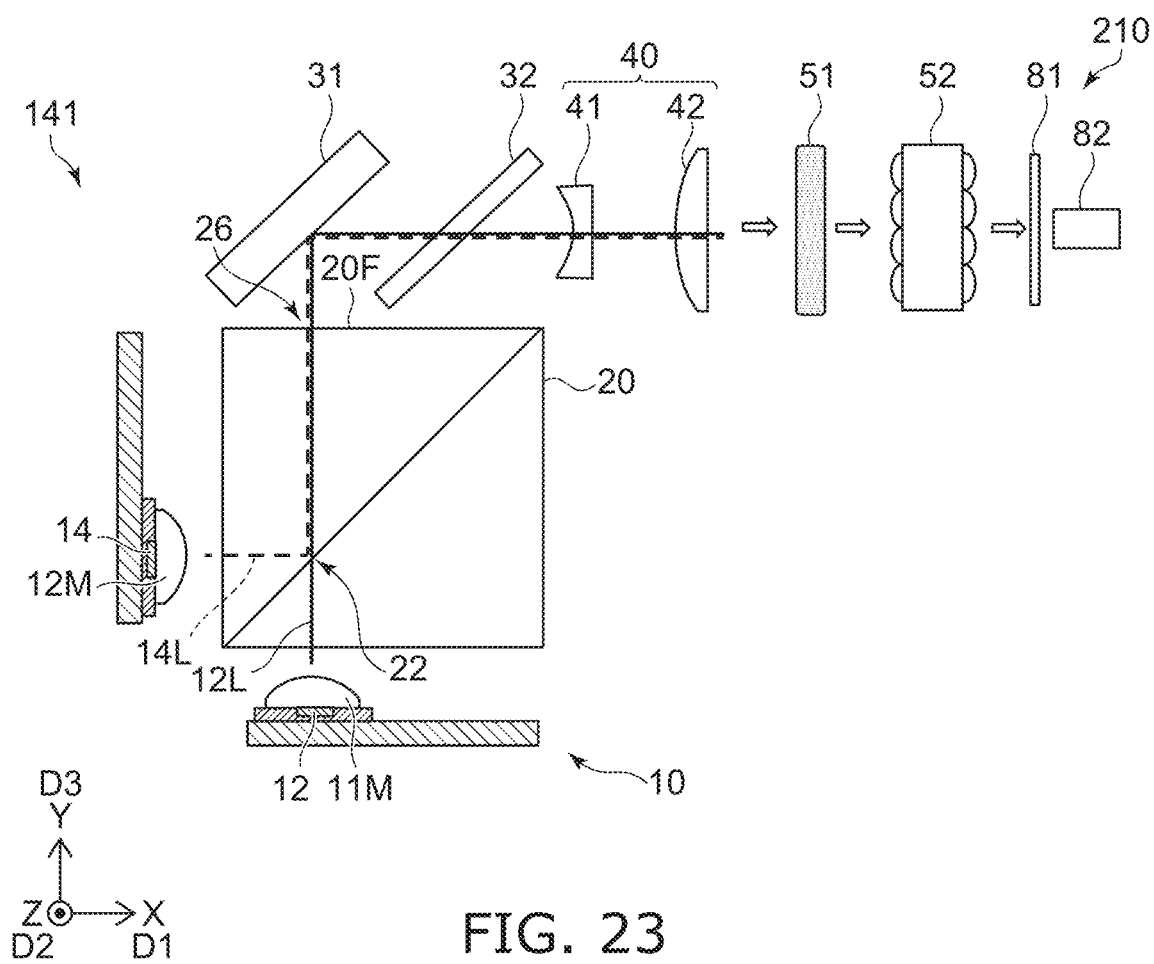
FIG. 23 is a schematic diagram illustrating another part of the light source device depicted in FIG. 22 and the display device according to the second embodiment.

FIGS. 22 and 23 are schematic diagrams illustrating a light source device 141 and the display device 210 according to the second embodiment.

As shown in FIGS. 22 and 23, the first laser beam 11L passes through the first region 21 in the light source device 141 according to the second embodiment. The second laser beam 12L passes through the second region 22. The third laser beam 13L is reflected by the first region 21. The fourth laser beam 14L is reflected by the second region 22. A light source device capable of uniforming the illuminance distribution is provided.

In the light source device 141, a direction from the second light source 12 to the first light source 11 is along the second direction D2. A direction from the fourth light source 14 to the third light source 13 is along the second direction D2.

In the light source device 141, the arrangement of light sources with different wavelengths is reversed. Such a configuration makes it easy to obtain uniform light. According to the present embodiment, a light source device capable of uniforming the illuminance distribution is provided.

In the present embodiment, the maximum luminance value within the illuminated region 10R is assumed to be 100%. The illuminated region 10R is divided into 16 equally divided regions, excluding portions where the luminance value is 10% or less of the maximum luminance value. The average luminance value in the region with the lowest average luminance value is defined as a first value among each average luminance value of the region divided into 16 equally divided regions. The average brightness value in the region with the highest average brightness value is defined as a second value. A ratio of the first value to the second value is defined as a first ratio. The uniformity of the illuminance distribution is high when the first ratio is high. In the embodiment, the first ratio is 50% or more in one example of a situation where the illuminance distribution is uniform. In another example of a situation where the illuminance distribution is uniform, the first ratio is 65% or more. In another example of a situation where the illuminance distribution is uniform, it is 80% or more. If the first ratio is excessively low, the suppression of speckle generation may be insufficient.

Third Embodiment

A third embodiment relates to a display device.

For example, as shown in FIGS. 2 and 3, the display device 210 according to the above embodiments includes the light source device according to the first embodiment or the second embodiment (the light source device 110 in the example shown in FIGS. 2 and 3), and the control element 81. As already described, light emitted from the light source device 110 enters the control element 81. The display device 210 may include the imaging optical member 82. The imaging optical member 82 forms an image of light emitted from the control element 81. The display device 210 is, for example, a projector. A display device capable of uniform display can be provided.

According to the above-described embodiments, it is possible to provide a light source device and a display device capable of uniforming the illuminance distribution.

In the specification of the application, "perpendicular" refers to not only strictly perpendicular but also include, for example, the fluctuation due to manufacturing processes, etc. It is sufficient to be substantially perpendicular.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in light source devices such as light sources, polarization multiplexing members, elements, mirrors, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all light source devices, and display devices practicable by an appropriate design modification by one skilled in the art based on the light source devices, and the display devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

What is claimed is:

1. A light source device, comprising:
   a polarization multiplexing member including a first region and a second region; and
   a light source part,
   the light source part including
      a first light source configured to emit a first laser beam having a first peak wavelength,
      a second light source configured to emit a second laser beam having a second peak wavelength different from the first peak wavelength,
      a third light source configured to emit a third laser beam having the first peak wavelength, and
      a fourth light source configured to emit a fourth laser beam having the second peak wavelength,
   the first laser beam being configured to pass through the first region,
   the second laser beam being configured to pass through the second region,
   the third laser beam being configured to be reflected by the first region, and
   the fourth laser beam being configured to be reflected by the second region.

2. A light source device, comprising:
   a polarization multiplexing member including a first region, a second region, a third region, and a fourth region; and
   a light source part,
   the light source part including
      a first light source configured to emit a first laser beam having a first peak wavelength,
      a second light source configured to emit a second laser beam having a second peak wavelength different from the first peak wavelength,
      a third light source configured to emit a third laser beam having a third peak wavelength different from the first peak wavelength and different from the second peak wavelength,
      a fourth light source configured to emit a fourth laser beam having the second peak wavelength,
      a fifth light source configured to emit a fifth laser beam having the third peak wavelength,
      a sixth light source configured to emit a sixth laser beam having the second peak wavelength, a seventh light source configured to emit a seventh laser beam having the first peak wavelength, and an eighth light source configured to emit an eighth laser beam having the second peak wavelength, the first laser beam being configured to pass through the first region, the second laser beam being configured to pass through the second region, the third laser beam being configured to be reflected by the first region, the fourth laser beam being configured to be reflected by the second region, the fifth laser beam being configured to pass through the third region, the sixth laser beam being configured to pass through the fourth region, the seventh laser beam being configured to be reflected by the third region, and the eighth laser beam being configured to be reflected by the fourth region.

3. The light source device according to claim 2, wherein the polarization multiplexing member further includes a first surface that includes a fifth region, a sixth region, a seventh region, and an eighth region, the first and third laser beams are emitted from the fifth region, the second and fourth laser beams are emitted from the sixth region, the fifth and seventh laser beams are emitted from the seventh region, and the sixth and eighth laser beams are emitted from the eighth region.

4. The light source device according to claim 2, wherein the second peak wavelength is longer than the first peak wavelength, and the first peak wavelength is longer than the third peak wavelength.

5. The light source device according to claim 3, wherein a direction from the fifth region to the sixth region is along a first direction, a direction from the seventh region to the eighth region is along the first direction, a direction from the seventh region to the fifth region is along a second direction crossing the first direction, and a direction from the eighth region to the sixth region is along the second direction.

6. The light source device according to claim 5, wherein a direction from the first light source to the second light source is along the first direction, a direction from the third light source to the fourth light source is along a third direction crossing a plane including the first direction and the second direction, a direction from the fifth light source to the sixth light source is along the first direction, a direction from the seventh light source to the eighth light source is along the third direction, a direction from the fifth light source to the first light source is along the second direction, a direction from the sixth light source to the second light source is along the second direction, a direction from the seventh light source to the third light source is along the second direction, and a direction from the eighth light source to the fourth light source is along the second direction.

7. The light source device according to claim 6, wherein the first light source emits the first laser beam in the third direction, the second light source emits the second laser beam in the third direction, the third light source emits the third laser beam in the first direction, the fourth light source emits the fourth laser beam in the first direction, the fifth light source emits the fifth laser beam in the third direction, the sixth light source emits the sixth laser beam in the third direction, the seventh light source emits the seventh laser beam in the first direction, and the eighth light source emits the eighth laser beam in the first direction.

8. The light source device according to claim 2, wherein a distance between the first and third light sources is shorter than a distance between the first and fourth light sources, and shorter than a distance between the second and third light sources.

9. The light source device according to claim 2, wherein a distance between the second and fourth light sources is shorter than a distance between the second and third light sources, and shorter than a distance between the first and fourth light sources.

10. The light source device according to claim 3, wherein the polarization multiplexing member is a polarization beam splitter.

11. The light source device according to claim 3, further comprising:

a first mirror; and a second mirror, the first and third laser beams passing through the fifth region are reflected by the first mirror and then pass through the second mirror, the second and fourth laser beams passing through the sixth region are reflected by the second mirror, the fifth and seventh laser beams passing through the seventh region are reflected by the first mirror and then pass through the second mirror, and the sixth and eighth laser beams passing through the eighth region are reflected by the second mirror.

12. The light source device according to claim 11, further comprising:

a light shaping member, the first and third laser beams that have passed through the second mirror, the second and fourth laser beams reflected by the second mirror, the fifth and seventh laser beams that have passed through the second mirror, and the sixth and eighth laser beams reflected by the second mirror being configured to enter the light shaping member.

13. The light source device according to claim 12, further comprising:

a diffusion element, the first to eighth laser beams that have passed through the light shaping member being configured to enter the diffusion element.

14. The light source device according to claim 13, further comprising:

a fly-eye lens, the first to eighth laser beams that have passed through the diffusion element being configured to enter the fly-eye lens.

15. The light source device according to claim 5, wherein the light source includes a plurality of the first light sources and a plurality of the third light sources, and a direction from one of the plurality of first light sources to another one of the plurality of first light sources is along the second direction, and
a direction from one of the plurality of the third light sources to another one of the plurality of third light sources is along the second direction.

16. The light source device according to claim 2, wherein
the first and fifth light sources are sealed by a first sealing member,
the second and sixth light sources are sealed by a second sealing member,
the third and seventh light sources are sealed by a third sealing member,
the fourth and eighth light sources are sealed by a fourth sealing member, and
the first, second, third, and fourth sealing members are separated from each other.

17. A light source device, comprising:
a polarization multiplexing member including a first region, a second region, a third region, and a fourth region; and
a light source part,
the light source part including
a first light source configured to emit a first laser beam being green,
a second light source configured to emit a second laser beam being red,
a third light source configured to emit a third laser beam of being blue,
a fourth light source configured to emit a fourth laser beam being red,
a fifth light source configured to emit a fifth laser beam being blue,
a sixth light source configured to emit a sixth laser beam being red,
a seventh light source configured to emit a seventh laser being green, and
an eighth light source configured to emit an eighth laser beam being red,
the first laser beam being configured to pass through the first region,
the second laser beam being configured to pass through the second region,
the third laser beam being configured to be reflected by the first region,
the fourth laser beam being configured to be reflected by the second region,
the fifth laser beam being configured to pass through the third region,
the sixth laser beam being configured to pass through the fourth region,
the seventh laser beam being configured to be reflected by the third region, and
the eighth laser beam being configured to be reflected by the fourth region.

18. A display device, comprising:
the light source device according to claim 2;
a control element, a light emitted from the light source device being configured to enter the control element; and
an imaging optical member configured to form an image of a light emitted from the control element.

19. The light source device according to claim 1, wherein
the first and second light sources are arranged in a first direction, and
the third and fourth light sources are arranged in a second direction crossing the first direction.

20. The light source device according to claim 1, wherein
the first and second light sources are arranged in a first direction, and
the third and fourth light sources are arranged in the second direction.

* * * * *